US012123951B1

(12) United States Patent
DeWeert et al.

(10) Patent No.: US 12,123,951 B1
(45) Date of Patent: Oct. 22, 2024

(54) SYSTEM AND METHOD OF UTILIZING POLARIZED LIGHT FOR REMOTE OPTICAL CHARACTERIZATION OF AND THROUGH SCATTERING MEDIA

(71) Applicant: BAE SYSTEMS INFORMATION AND ELECTRONIC SYSTEMS INTEGRATION INC., Nashua, NH (US)

(72) Inventors: Michael J. DeWeert, Kaneohe, HI (US); Eric M. Louchard, Miami, FL (US); Reid A. Noguchi, Honolulu, HI (US); Gary Sawai, Wahiawa, HI (US); Dugan C. Yoon, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 384 days.

(21) Appl. No.: 17/733,227

(22) Filed: Apr. 29, 2022

(51) Int. Cl.
| | |
|---|---|
| *G01S 17/89* | (2020.01) |
| *G01J 4/04* | (2006.01) |
| *G01S 7/4861* | (2020.01) |
| *G06T 5/73* | (2024.01) |

(52) U.S. Cl.
CPC ............... *G01S 17/89* (2013.01); *G01J 4/04* (2013.01); *G01S 7/4861* (2013.01); *G06T 5/73* (2024.01); *G06T 2207/20201* (2013.01)

(58) Field of Classification Search
CPC .......... G01S 17/89; G01S 7/4861; G01J 4/04; G06T 5/73; G06T 2207/20201
USPC ........................................................ 382/255
See application file for complete search history.

(56) References Cited

U.S. PATENT DOCUMENTS

| | | | | | |
|---|---|---|---|---|---|
| 3,689,156 | A | * | 9/1972 | Kerpchar | G01S 17/18 351/49 |
| 5,231,401 | A | * | 7/1993 | Kaman | G01S 17/89 342/55 |
| 5,838,239 | A | * | 11/1998 | Stern | B64D 15/20 356/369 |
| 6,122,404 | A | * | 9/2000 | Barter | G02B 27/28 382/254 |

(Continued)

FOREIGN PATENT DOCUMENTS

| | | | | |
|---|---|---|---|---|
| WO | WO-2007129326 A2 | * | 11/2007 | ............. G06T 5/007 |
| WO | WO-2019050516 A1 | * | 3/2019 | ................ G01J 1/00 |

OTHER PUBLICATIONS

Michael J. Deweert, U.S. Appl. No. 17/733,095, filed Apr. 29, 2022, Title: System and Method Utilizing Medium Characterization in Object Ranging, (Status: Not Yet Published by the USPTO, but reviewable by the Examiner).

*Primary Examiner* — Mahendra R Patel
(74) *Attorney, Agent, or Firm* — Sand, Sebolt & Wernow LPA

(57) ABSTRACT

A system and method is provided to characterize optical properties (Scattering, attenuation, de-polarization) of a light-transmitting medium and local environment, by determining a scattering rate of light through a medium, wherein determining the scattering rate of light through the medium is accomplished by utilizing polarized light transmitted from an optical source. The system and method performs a function based on the characterized optical properties of the medium, wherein the function is one of, for example: detection of objects embedded in the medium, object ranging through the medium, or deblurring of images acquired through the medium.

10 Claims, 22 Drawing Sheets

(56) References Cited

U.S. PATENT DOCUMENTS

| | | | |
|---|---|---|---|
| 7,400,384 B1 * | 7/2008 | Evans | G01S 7/4811 356/5.01 |
| 7,787,131 B1 * | 8/2010 | Moran | G01B 9/02098 356/520 |
| 7,855,786 B2 * | 12/2010 | Sparks | H04N 23/11 356/419 |
| 8,717,562 B2 * | 5/2014 | Smart | G01N 15/0211 356/336 |
| 9,445,115 B2 | 9/2016 | Deweert et al. | |
| 9,476,700 B2 | 10/2016 | Deweert et al. | |
| 9,818,181 B1 | 11/2017 | Acker et al. | |
| 10,416,303 B2 * | 9/2019 | Hellsten | G01S 7/292 |
| 10,620,051 B2 | 4/2020 | Acker et al. | |
| 10,634,765 B1 | 4/2020 | Acker et al. | |
| 10,643,313 B2 | 5/2020 | Deweert et al. | |
| 10,794,767 B1 * | 10/2020 | Acker | G01J 4/02 |
| 10,863,121 B1 | 12/2020 | Deweert | |
| 10,911,696 B2 * | 2/2021 | Choiniere | G01J 5/0803 |
| 10,931,899 B1 | 2/2021 | Deweert | |
| 11,069,035 B2 | 7/2021 | Deweert | |
| 2002/0135752 A1 * | 9/2002 | Sokolov | A61B 5/444 356/39 |
| 2003/0025917 A1 * | 2/2003 | Suhami | G01B 9/02091 356/601 |
| 2003/0048499 A1 * | 3/2003 | Alfano | H04B 10/1121 398/5 |
| 2005/0264813 A1 * | 12/2005 | Giakos | G01J 3/447 356/369 |
| 2012/0112096 A1 * | 5/2012 | Meyers | G01N 21/21 250/459.1 |
| 2014/0303463 A1 * | 10/2014 | Robinson | G01J 3/02 600/316 |
| 2019/0018143 A1 * | 1/2019 | Thayer | G01S 17/89 |
| 2019/0056498 A1 * | 2/2019 | Sonn | G01S 17/931 |
| 2021/0058607 A1 * | 2/2021 | Wang | G01S 17/894 |
| 2021/0302555 A1 | 9/2021 | Deweert | |
| 2021/0306248 A1 | 9/2021 | Deweert | |
| 2021/0323644 A1 | 10/2021 | Deweert et al. | |
| 2021/0372779 A1 | 12/2021 | Deweert et al. | |

* cited by examiner

SYSTEM AND METHOD OF UTILIZING POLARIZED LIGHT FOR REMOTE OPTICAL CHARACTERIZATION OF AND THROUGH SCATTERING MEDIA

STATEMENT OF GOVERNMENT INTEREST

This invention was made with government support under Contract No. N00014 18 C 2050 awarded by the United States Navy. The government has certain rights in the invention.

TECHNICAL FIELD

The present disclosure relates to the field optics, and more particularly LIDAR polarimetry. More particularly, the present disclosure relates to characterizing the optical properties of a medium using polarimetry and exploiting the characterizations to obtain a functional result.

BACKGROUND

Electrical systems that enhance situational awareness are beneficial inasmuch as they provide information about an environment that would otherwise be difficult to detect without the electrical system. One exemplary electrical system or device is a light amplification detection and ranging (LIDAR) system. A LIDAR system or a LIDAR assembly is typically carried by a moving platform, such as an aircraft, regardless of whether it is manned or unmanned. The LIDAR assembly generates a beam of light or electromagnetic radiation (i.e., a laser beam) that is directed at an object. The beam is reflected back and captured by a polarization-sensitive sensor. The radiation returns are analyzed by software, logic, or other electrical processes. The processing of the returned radiation enables a computer implemented device or process to evaluate the returned radiation data and generate a map of surfaces that the beam contacted.

In one example, a LIDAR assembly is used to map the floor of the ocean. In this example, the beam from the LIDAR is directed downwardly into the sea water. The LIDAR may be either flown above the surface of the ocean and directed downwardly into the ocean, or the LIDAR may be carried by a ship or underwater vehicle and be directed into the water without needing to travel through the atmosphere before reaching the ocean floor. The light beam penetrates the ocean and travels down to the sea bottom or underwater objects where it is reflected back as a return radiation. The return radiation is processed to generate a 3D map of the ocean and embedded objects.

Mapping below the ocean surface is advantageous inasmuch as it provides accurate representations of the marine environment. However, sometimes mapping subsurface marine environments can be difficult due to naturally occurring disturbances in the ocean which cause glints or scattering events that can disrupt the light or laser beam in the LIDAR systems. Further, scattering interference from the medium and suspended or dissolved materials adds blur and veiling radiance that impede precise localization, including, but not limited to, accurate depths or ranges of objects.

Still further, for non-polarimetric range-gated LIDAR systems, the precision of range estimation is limited to the width and separation of the LIDAR range gates. For example, if the range gate is five meters thick, the objects can be localized to within five meters of range. To achieve precise range determination requires collecting multiple image slices (i.e., data at many ranges with small range separations) and generating a data "cube" or "smart cube" based on the collected image slices. The data cube or smart cube is then processed to compute precise range. The 3D data cube entails a processing and data-storage burden much greater than is required for detecting objects in two-dimensional (2D) images. In addition, blur due to multiple forward scattering further impedes identification of object edges, reducing range-estimation accuracy.

In some instances, it may be difficult to accurately determine range or depth of objects of interest below the surface of the ocean because glints, scattering interference, wave refraction, or other properties of the medium (i.e., seawater, air or both) can disrupt a light beam generated by a LIDAR assembly and observed by a polarization-sensitive sensor or camera.

A LIDAR polarimetry system utilizes various types of polarization, including, but not limited to, linear polarization, circular polarization, and elliptical polarization to accurately estimate the depths or ranges of objects of interest. Linear polarization of electromagnetic radiation is a confinement of the electric field vector or magnetic field vector to a given plane along the light propagation direction. Generally, the polarization state of an electromagnetic wave is defined by the direction of the electric field vector. For example, if the electric field vector is vertical (alternately up and down as the wave travels), the radiation is said to be vertically polarized.

More generally, linear polarization is a special case of elliptical polarization. In elliptical polarization, the tip of the electric field vector varies in time, tracing an ellipse in the plane normal to the light propagation direction. The total electromagnetic field can be resolved into a superposition of two linearly-polarized waves with their electric fields at right angles to each other, defining the major axis and minor axis of the ellipse. In linear polarization, the minor axis approaches zero length. A degree of linear polarization (DOLP) is a quantity used to describe the ratio of intensity of the linearly polarized components of an electromagnetic wave (such as a laser beam) to the total intensity thereof. A perfectly linearly polarized wave has a DOLP of 100%, whereas an unpolarized wave has a DOLP of 0%. A wave which is partially polarized, and therefore can be represented by a superposition of a polarized and unpolarized component, will have a DOLP somewhere in between 0 and 100%. DOLP is calculated as the fraction of the total power that is carried by the polarized component of the wave.

Similarly, circular polarization is a special case of elliptical polarization in which the minor axis equals the major axis. In addition to the ratio of minor to major axis lengths, and the orientation of the major axis, elliptical polarization is characterized by the rotation direction of the electric field along the polarization ellipse. The field may rotate either right-handedly or left-handedly with respect to the direction of propagation. In technical discussions, this handedness is also called chirality. Thus, there are two different directions of circular polarization, distinguished by chirality. Elliptical polarization states are further distinguished by the ratio of major to minor axes, and by the direction of the major axis, in addition to the chirality.

DOLP can be used to distinguish circularly-polarized chirality, by using optical components known as quarter-wave plates (QWPs) to convert circular polarization to linear polarization. The conversion of circular to linear polarization enables the use of linear polarizers to compute a degree of circular polarization (DOCP) from DOLP. If an object of interest provides a DOCP response that differs from the background, DOCP can then be used to detect that object. The process may be further generalized to discriminate different elliptical polarization states via combinations of beam splitters, linear polarizers, and wave plates. Similarly, elliptical polarization may be resolved into a combination of linear components by using a combination of wave plates and beam splitters, and DOLP can be computed for those linear components. Thus, DOLP can be made sensitive to changes in linear, circular, or elliptical polarization, to compute the DOP (Degree of Polarization), which is a quantity used to describe the ratio of intensity of the polarized components of an electromagnetic wave (such as a laser beam) to the total intensity thereof, for those polarization types. It should be noted that the DOP may also be referred to as the polarization intensity.

In scattering media or a scattering medium, there can be differences between polarization types in the rates at which an initially perfectly-polarized beam is scattered into a combination of polarization states. In particular, the rate of conversion of light of one circular polarization into light of the opposite circular polarization may occur over a greater distance than for conversion of a linearly polarized beam into other linear polarizations. This difference in depolarization rates will enable determination of range at greater distances by using the optimal combination of laser and receiver polarizations.

Because different materials reflect polarized light differently, illuminating a scene with polarized light and recording the polarization state of the reflected radiation can discriminate various objects of interest. Accurately registering polarization information with precise range to target and three-dimensional (3D) shape information would enhance the discriminatory power.

By using a pulsed laser illuminator and range-gated cameras, environmental scattering interference is minimized, allowing polarized imagery of objects of interest. Range-gated polarimetry has proven useful, for example, in remote imaging of objects in the ocean, and for discriminating between objects on land.

Previous ocean or medium characterization techniques utilize a beam transmissometer to collect total attenuation, which is total attenuation plus absorption. Then, there is a separate instrument (i.e., a radiometer) that looks up at the sky (through the water column) and determines what the attenuation rate is because it is dropped down through the medium, such as through the seawater, and as it is dropped through depth it observes the amount of sunlight that is dimmed through the water. This device is then able to determine the absorption rate of the water. These two devices are able to provide total attenuation and the absorption. From there, an oceanographer can perform mathematical calculations to obtain the scattering rate. Namely, once the total attenuation rate from the beam transmissometer is obtained and the absorption rate is obtained from the upward looking radiometer, the difference is the scattering rate that is used to calculate or filter out blur.

More particularly, beam transmissometers (or simply transmissometers) measure the total attenuation c of light. The total attenuation c is due to contributions from both absorption a and total scattering b, since scattering removes light from the beam path. The total scattering b can be partitioned into forward-scattering $b_F$ and backward-scattering $b_B$ components, so that: $c=(a+b)=(a+b_F+b_B)$. Upward-looking radiometers measure a quantity called diffuse attenuation, K which is dominated by absorption, but also includes effects from scattering. The effects of scattering on K depend on a variety of factors that can only be computed approximately. Further, the value of K depends on details of the measurement system, so that K values estimated from diffuse radiometers are not the same as the LIDAR-attenuation K. Having c and diffuse K, thus can give estimates of b which have significant uncertainty and unclear relationships to remote-sensing parameters. Knowing $b_F$ is particular helpful for remote sensing because the forward scattering causes image blur that complicates object detection and identification.

SUMMARY

Issues continue to exist with medium characterization and depth finding or altitude finding. Namely, prior attempts required the use of beam transmissometers and a radiometer to obtain the scattering rate and attenuation profile, respectively. The system of the present disclosure is able to determine the forward scattering rate so it can be utilized to filter out blur without the total attenuation profile from the beam transmissometer because the present disclosure enables a polarization sensor that provides this information automatically. Essentially, the system of the present disclosure can characterize the forward scattering in a faster, less expensive, and more efficient manner without having to require physical devices such as a beam transmissometer and/or a radiometer. Rather, the system of the present disclosure can perform forward scattering characterization through only the use of a LiDAR system.

The system of the present disclosure is enabled to perform medium characterization to perform an image deblurring process (and/or other scattering-dependent functions, such as finding altitude of a flying platform in a low-to-no visibility environment so that medium characterization performed to find altitude can be used to land the platform) based on the scattering rate without having to deploy physical devices into the medium (i.e., without a beam transmissometer and a radiometer). Now, based on the system and method of the present disclosure, a platform may fly over the ocean or other medium carrying a LiDAR or polarimetric LiDAR, which is LiDAR with the ability to detect polarization. The polarimetric LiDAR sends the polarized laser beam into the medium or seawater and obtain the images of XrPol and CoPol at different depths in order to determine the scattering rate and attenuation profile so that the deblurring process can be completed. The system and method in present disclosure is advantageous in performing more efficient calculations than the previous capabilities because the system obtains the attenuation rate, like the radiometer, however, instead of obtaining total attenuation, the system and method of the present disclosure obtains forward scattering from the depolarization rate.

It is known from experiments before that the LIDAR depolarization rate is mathematically related to the forward scattering rate. Namely, the depolarization rate is about ⅐ of forward scattering. This mathematical relationship can be utilized and exploited during the deblurring process to provide an enhanced image. The mathematical relationship of the depolarization rate being about ⅐ of the forward scattering is applicable to seawater. When the medium is seawater, the deblurring process utilizes a water point-spread function and deconvolves it to deblur the resultant image. The rate of depolarization to forward scattering must be determined for other mediums (ex. air, smog, or air with dust and/or other particulates) as described herein.

The system and method of the present disclosure also obtains the depolarization rate of the laser beam through the medium, which is beneficial in and of itself, because a scattering medium depolarizes the beam differently than do reflective objects embedded in the medium. Particularly, the beam depolarizes relatively slowly as it propagates through the medium. However, when the beam hits an object or surface, the depolarization is instantaneous. Most objects or surfaces instantaneously and completely depolarize the beam. Thus, if the system is observing the medium, such as seawater, and a detection is very bright in the XrPol channel and nothing else is bright in the XrPol channel, then the system is extremely confident that there is an object in the water and not just a wave-focusing event. This provides the system and method of the present disclosure better abilities to detect objects within the water. Particularly, it is useful for finding the depth of the water using in stride polarimetric LIDAR. Additionally, this feature can be expanded to characterize depth or altitude in any medium. For example, the system and method of the present disclosure does not need to be limited to seawater. Rather, the system can be expanded and applied to other mediums, such as air, when visibility is limited. For example, a helicopter can utilize a polarimetric LIDAR to obtain altitude of the platform or helicopter relative to the ground when the platform is descending or attempting to land in a dusty, foggy, darkened, or other low visibility situation by analyzing the polarization returns of the LIDAR.

The depolarization and attenuation rate of a medium may be combined with the depolarization characteristics of the bottom to obtain accurate depth information. Thus, the in-stride measurements (i.e., in real time while the platform is moving) from the polarimetric LiDAR can now utilize two polarimetric laser shots to characterize the water and a couple of laser shots that straddle the bottom to determine the depth to the bottom surface.

A range gate accepts light from a defined span of time relative to the transmission of a laser pulse, and thus a defined span of ranges related to time by the speed of light. Range gating can be accomplished, for example, by having a camera electronically coupled to a pulsed laser so that the camera turns on after a certain time delay and turns off at a later time. A range gate may also be defined by continuously recording the intensity of light versus time and integrating over a selected time span. Other gating methods are also possible.

For the bottom characterization portion of the system and method of the present disclosure, one exemplary embodiment utilizes wide or large gates that are on the order of meters thick, such as four meters wide. The thick or larger gates are set such that the gate begins and the gate ends at a distance where the bottom is predicted to be such that the beginning of the gate is above the predicted bottom surface and the end of the gate is below the predicted bottom surface such that the gate straddles the predicted bottom. However, the system desires to obtain more accurate information than a four meter gate, particularly down to the half-meter or so. Because it is known how the water effects the polarization of the beam and the system knows what the bottom does to the polarization of the beam, the system may analyze the polarization of the bottom from straddling return to obtain a precise estimate of what the depth is. If there are two shots at different depths, then a very precise estimate can be achieved. Now, based on the foregoing, the system is able to provide an entire bottom mapping of the lower surface or bottom of the ocean by simply flying over the ocean in a single pass.

The present disclosure relates to a system and method for characterizing the optical properties of a medium and leveraging said properties to identify items of interest within the medium. References made throughout the present disclosure refer to the medium as being either water, seawater, or air. However, the medium may be any medium. For example, the medium may be air that is visually clouded by snow, fog, dew, dust, smoke, or other properties or particulates. Thus the present disclosure characterizes the optical properties, specifically, the attenuation and depolarization rate of light in a given medium. For example, polarized light is shot or transmitted into the medium and as the polarized light progresses through the medium, the light scatters and begins to depolarize. The depolarization with distance can be exploited to determine the distance traveled. If there is a receiver on the platform that receives the reflection from the polarized beam of light and the polarization of the reflection is detected, then the characterization of the received polarized light is used to analyze how much of the beam is depolarized versus the range. For example, if there is a laser system that transmits a polarized pulse of light and there is a receiving camera or optical receiver that is timed so that it is range gated at certain time increments. The receiver that is range gated establishes a record of the intensity and the polarization of the light that is reflected in certain time increments. The system then analyzes the record of these optical events to determine the attenuation and depolarization rates of the medium. Once the attenuation rate and depolarization rate versus distance is known, then a lookup table may be utilized to compute what the distance is for a single snapshot. Establishing a lookup table permits rapid medium characterization for real time or in stride usage of the present invention This is advantageous for real time or in stride movement of the platform when the platform is moving over terrain or through a medium that do not have the ability to take hundreds of laser shots to step out data in order to characterize the medium.

For determining the characterization of a medium in stride with a moving platform, there are at least two laser shots that are separated by a fixed distance and depth. In this example, there is a first range and a second range wherein the first range and the second range are at different depths. The LIDAR collects polarization information of the reflected beam at both the first range and the second range from a plurality of laser shots. This results in at least four images or four pieces of image data, namely, CoPol and XrPol at a first range and CoPol and XrPol at the second range.

For example, the laser may be transmitted through the medium and step down at incremental gates. The laser may project through the medium until it hits the bottom, which causes complete depolarization. The gates begin nearly below the surface of the medium. As the system steps along in its gated increments, the attenuation and depolarization rate of the medium may change with depth. The present disclosure determines the attenuation profile versus depth and what the depolarization rate versus depth. This enables the system of the present disclosure to determine the attenuation profile and the depolarization rate to allow the polarized light to transmit through a scattering layer where the light is scattered but then becomes more clear below the scattering layer. Then, when the polarized light hits the bottom, there is a depolarization event in which all of the returns are depolarized and there is a bright flash as observed by the receiver. The gated observations characterize the medium during the step down process but now the system also has characterized the bottom based on its depolarization of the polarized light beam. Characterizing the optical properties of the medium is accomplished by evaluating the attenuation profile and the depolarization rate.

Particulates in a medium and other characteristics of the medium redirect or otherwise scatter photons of a laser. This results in dimmer or less intense light with depth. Forward scattering in the medium will depolarize the beam and also blur the images. Given the two optical properties of forward scattering and attenuation, the system is able to calculate image blur, and use mathematical deblurring calculations to account for and remove said blur. However, said blur can only be removed when the amount of blur is known. The characterization of the medium based on the depolarization rate and the attenuation profile in accordance with aspects of the present disclosure will allow an operator to estimate the amount of blur so that it can be filtered out mathematically. Notably, the "operator" can be, but is not required to be, a human operator. For example, the operator can be artificial intelligence or a supervisory machine-executed algorithm or set of instructions. The present disclosure may also operate to reduce or otherwise optimize the false alarm rate versus actual detection rate of an item to be detected, such as the depth of the floor within the medium. This is accomplished by assessing the quality of the data. For example, if it is known that the attenuation rate has reduced the laser to $\frac{1}{10}$ of 1% of the light that was transmitted at the surface, and now there is a hit or blip in the image, one can infer that this is likely noise that can be filtered out so as to optimize a detection threshold to preclude these events for the signal level achieved at each depth. The optimization allows the system to reduce the risk that a clutter object or noise object falsely provides a return that is not physically present. To obtain the depolarization rate, received light of two orthogonal polarizations from two or more different depths is required. To obtain the attenuation rate, the total received light (which is a sum of orthogonal polarizations) from at least two different depths is required. Thus, at least four shots are needed, including XrPol and CoPol at a shallow depth and XrPol and CoPol at a deeper depth.

Total scattering refers to forward scattering plus backward scattering. Forward scattering can be observed through one or more scattering layers in the medium that cause the light to scatter as the light propagates therethrough. Back scattering refers to scattering light observed from the optical receiver in response to the light being propagated outward from the LiDAR laser beam generator. In accordance with the present disclosure, backwards scattering is utilized to determine portions of the attenuation profile of a medium. Similarly, forward scattering is used to determine the depolarization rate.

The present disclosure provides an improved method, process, and system for obtaining the forward scattering rate of light through a medium. Knowing the scattering rate is advantageous because it lets an operator or the system know how much blur will be in an image. When the forward scattering rate is known, then the blurriness of the image can be mathematically resolved to deblur the image. If the deblurring cannot be mathematically accounted for, then the system can set a detection threshold to not give false alarms.

In accordance with one aspect of the present disclosure, an exemplary embodiment of an ocean LIDAR polarimetry system exploits the fact that (i) polarized light depolarizes at a finite rate as it moves through a multiple-scattering fluid; (ii) glints and backscatter tend to preserve polarization, so that a polarized beam backscattered from the scattering medium is still at least partially polarized; (iii) the scattering-medium depolarization rate is approximately exponential with range; (iv) the depolarization can be characterized via degree of linear polarization (DOLP) measurements with a polarimetric LIDAR; (v) the depolarization rate is likely to be at least as long for circularly polarized light and elliptically polarized light as for linearly polarized light; (vi) the ocean bottom and many objects of interest depolarize the LIDAR light upon reflection, and (vii) the apparent DOP of such depolarizing objects is composed of the object LIDAR reflection combined with the scattering medium polarized reflection in such a manner that the apparent DOP can be related to the range to the depolarizing object.

In accordance with another aspect of the present disclosure, an exemplary embodiment of an ocean LIDAR polarimetry system and method thereof may include characterizing the depolarization rate of the fluid. This requires a highly-polarized light source and two or more polarization-sensitive sensors, at least one of which is co-polarized with the laser and at least one of which is oppositely-polarized versus the laser.

In one aspect, an exemplary embodiment of the present disclosure may provide a method comprising: characterizing optical properties of a medium by determining a scattering rate of light through a medium, wherein determining the scattering rate of light through the medium is accomplished by utilizing polarized light transmitted from an optical source; and performing a function based on the characterized optical properties of the medium, wherein the function is selected from a group comprising: object detection in the medium, object ranging through the medium, or image deblurring of an object in the medium. In this exemplary embodiment or another exemplary embodiment, wherein when the function is image deblurring of an object in the medium, deblurring the image is accomplished by executing a mathematical deblurring function that accounts for the total scattering obtained from attenuation characterization (K) and a depolarization rate ($K_{DOLP}$) using polarized light generated from the optical source. In another exemplary embodiment, characterizing the scattering rate is accomplished by a Leaky-Memory Average Method comprising: reducing noise of a single-image-pair characterization (K) estimation; collecting multiple image pairs; computing K and $K_{DOLP}$ for each image pair, averaging resultant K and $K_{DOLP}$ values together; and using the resultant K and $K_{DOLP}$ values to perform the selected function of object detection in the medium, object ranging through the medium, or image deblurring of an object in the medium. In another exemplary embodiment, performing the function is accomplished by a Running Average Method comprising: keeping in-stride image-pair characterization (K) estimates of a most recent N-number of image shots in a memory; for an image shot pair at a desired depth, computing a new in-stride image-pair characterization ($K_{In\_Stride}$ (New)); updating a running average; and using the running average to perform the selected function of object detection in the medium, object ranging through the medium, or image deblurring of an object in the medium. In another exemplary embodiment, the image shot pair at a desired depth is a most recent image shot pair. In another exemplary embodiment, performing the function is accomplished by a Leaky-Memory Method comprising: utilizing an exponential-decay rate ε ($\approx 1/N$) of a most recent N-number of image shots; for an image shot pair, computing an actual gate-start depth Z, and computing mean K-value (μ(New)) that equals a dark-correct and flat-corrected mean of a central portion of a total intensity (XrPol+CoPol) of the image shot pair; updating leaky-memory averages of the mean K-value of signal levels at one or more depths of interest; computing a new in-stride image-pair characterization ($K_{In\_Stride}$ (New)); and using the leaky-memory averages to perform the selected function of object detection in the medium, object ranging through the medium, or image deblurring of an object in the medium. In another exemplary embodiment, the image shot pair is a most recent image shot pair. In another exemplary embodiment, the method includes selecting a value of s according to how rapidly a medium characterization factor is expected to change over a course of data collection. In another exemplary embodiment, characterization of the optical properties of the medium is accomplished without using a beam transmissometer or a beam radiometer. In another exemplary embodiment, the method includes transmitting polarized light through the medium, wherein the polarized light scatters as it progresses through the medium and the polarized light is depolarized and reflected in response to contacting an object or surface in the medium; receiving reflected depolarized light, subsequent to contact with the object or surface, in an optical receiver that is range gated over two or more time intervals; determining a distance that the polarized light traveled based on the reflected depolarized light. In another exemplary embodiment, determining a distance that the polarized light traveled based on the reflected depolarized light is accomplished by: determining a scattering rate of the polarized light; determining an attenuation rate of the polarized light; and utilizing the scattering rate and the attenuation rate to determine the distance that the polarized light traveled. In another exemplary embodiment, determining the scattering rate of the polarized light and determining the attenuation rate of the polarized light is performed while moving a platform carrying an optical source that transmits the polarized light. In another exemplary embodiment, the method includes setting one gate period to straddle the object or surface based on a predicted distance to the object or surface. In another exemplary embodiment, the method includes obtaining a first image of the reflected depolarized light at a first gate corresponding to a first depth in the medium; obtaining a second image of the reflected depolarized light at a second gate corresponding to a second depth in the medium; wherein the first depth is different than the second depth. In another exemplary embodiment, the method includes obtaining co-polarization (CoPol) and cross-polarization (XrPol) information in the first image at the first gate; and obtaining CoPol and XrPol information in the second image at the second gate. In another exemplary embodiment, the method includes optimizing a false alarm rate of detection of the object or surface based on the attenuation rate. In another exemplary embodiment, characterizing the scattering medium is accomplished by moving a platform carrying a laser imaging detection and ranging (LIDAR) system only once over an object to be detected.

In another aspect, another exemplary embodiment of the present disclosure may provide a system comprising: a moveable platform carrying a laser imaging detection and ranging (LIDAR) system, a laser beam-projector assembly that generates a polarized laser beam, and a polarization-sensitive sensor that receives reflected signal radiation from a surface; and ranging logic to determine a distance between the moveable platform and the surface by moving the moveable platform over the surface only a single time based on characterized optical properties of a medium having been determined by a scattering of light through the medium, wherein determining a scattering of light through the medium is based on scattering rate and attenuation rate of the polarized laser beam through the medium as observed in the reflected signal radiation. In another exemplary embodiment, the moveable platform is an airborne platform and the surface is ground, and wherein the medium is air containing haze, fog, dust, smoke, or humidity that interrupt human-observable visibility (e.g. the system also works with UV and IR wavebands), and the ranging logic in communication with a platform guidance system, wherein the ranging logic assists platform guidance and altitude determination in low-to-no visibility scenarios. In another exemplary embodiment, the logic to characterize the scattering rate is accomplished by a Leaky-Memory Average Method comprising: instructions to reduce noise of a single-image-pair characterization (K) estimation; instructions to collect multiple image pairs; instructions to compute K and a depolarization rate ($K_{DOLP}$) for each image pair, then averaging resultant K values together; and instructions to use the resultant K and $K_{DOLP}$ values to determine the distance between the moveable platform and the surface. In another exemplary embodiment, there is logic to characterize the scattering rate by a Running Average Method comprising: instructions to keep in-stride image-pair characterization (K) estimates and a depolarization rate ($K_{DOLP}$) of a most recent N-number of image shots in a memory; instructions to, for an image shot pair at a desired distance from the surface, compute a new in-stride image-pair characterization ($K_{In\_Stride}$ (New)); instructions to update a running average; and instructions to use the running average to determine the distance between the moveable platform and the surface. In another exemplary embodiment, the image shot pair at a desired range is a most recent image shot pair. In another exemplary embodiment, there is logic to characterize the scattering rate by a Leaky-Memory Average Method comprising: instructions to utilize an exponential-decay rate $\varepsilon$ ($\approx 1/N$) of a most recent N-number of image shots; instructions to, for an image shot pair, compute an actual gate-start depth Z, and computing mean K-value ($\mu$(New)) that equals a dark-correct and flat-corrected mean of a central portion of a total intensity (XrPol+CoPol) of the image shot pair; instructions to update leaky-memory averages of the mean K-value of signal levels at one or more depths of interest; instructions to compute a new in-stride image-pair characterization ($K_{In\_Stride}$ (New)); and instructions to use the leaky-memory averages to determine the distance between the moveable platform and the surface. In another exemplary embodiment, the image shot pair is a most recent image shot pair. In another exemplary embodiment, there is instructions to select a value of $\varepsilon$ according to how rapidly a medium characterization factor is expected to change over a course of data collection. In another exemplary embodiment, characterization of the optical properties of the medium is accomplished without using a beam transmissometer or a beam radiometer. In another exemplary embodiment, there are instructions to effectuate transmission of polarized light through the medium, wherein the polarized light scatters as it progresses through the medium and the polarized light is depolarized and reflected in response to contacting an object or surface in the medium; instructions to effectuate reception of reflected depolarized light, subsequent to contact with the object or surface, in an optical receiver that is range gated over two or more time intervals; and instructions to determine the distance that the polarized light traveled based on the reflected depolarized light. In another exemplary embodiment, determining the distance that the polarized light traveled based on the reflected depolarized light is accomplished by: instructions to effectuate determination of the scattering rate of the polarized light; instructions to effectuate determination of the attenuation rate of the polarized light; and instructions to effectuate utilize the scattering rate and the attenuation rate to determine the distance that the polarized light traveled. In another exemplary embodiment, there is instructions to set one gate period to straddle the surface based on a predicted distance to the surface. In another exemplary embodiment, there is instructions to obtain a first image of the reflected depolarized light at a first gate corresponding to a first depth in the medium; instructions to obtain a second image of the reflected depolarized light at a second gate corresponding to a second depth in the medium; wherein the first depth is different than the second depth. In another exemplary embodiment, there is instructions to obtain co-polarization (CoPol) and cross-polarization (XrPol) information in the first image at the first gate; and instructions to obtain CoPol and XrPol information in the second image at the second gate. In another exemplary embodiment, there is instructions to optimize a false alarm rate of detection of the surface based on the attenuation rate.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
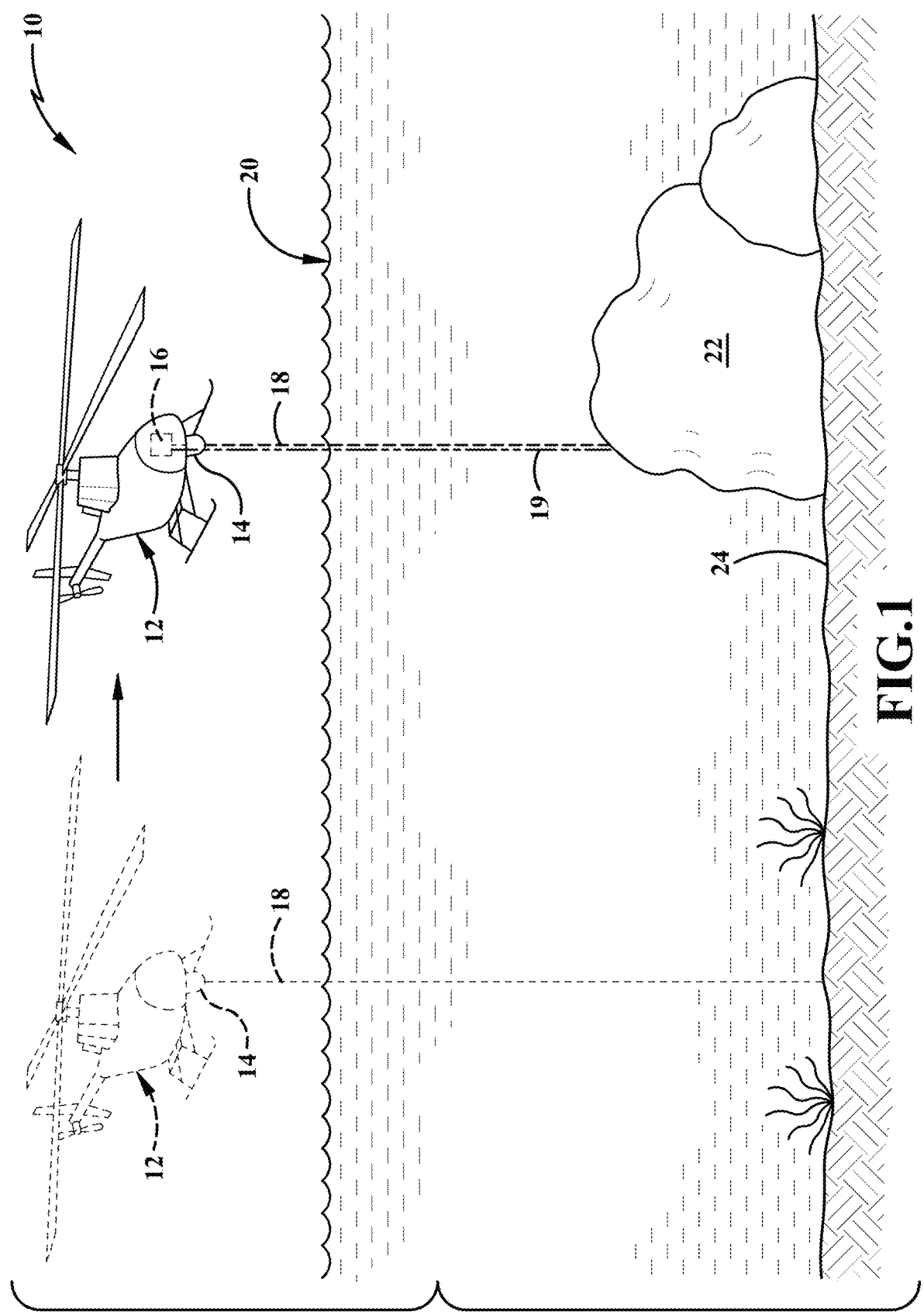
FIG. 1 is an operational diagrammatic view of system for characterizing optical properties of a medium according to one exemplary aspect of the present disclosure.

The present disclosure utilizes the following defined terms throughout the Specification and appended Claims.

Table of Definitions

| Term | Definition |
|---|---|
| $R_{Bgd,Co}$ | Background return of co-polarized channel |
| $R_{Bgd,Xr}$ | Background return of the cross-polarized channel |

| Term | Definition |
| --- | --- |
| $R_{Bgd,T}$ | total background return (co-polarized plus cross-polarized) |
| $Z_{Bott}$ | range to an opaque boundary |
| Z | Range or depth |
| $Z_{obj}$ | Range to an object |
| $\rho_w$ | Reflectance of water or other medium |
| $\rho_{Bott}$ | Reflectance of the bottom or other opaque surface |
| $I_{transmitted}$ | Transmitted intensity of the beam |
| $D_{xr}$ | Fraction of light that is co-polarized with the laser |
| $D_{co}$ | Fraction of Light that is cross-polarized with the laser |
| BSI | Backscatter Interference. The veiling radiance reflected by the medium that can obscure the images of embedded objects |
| DEq | The degree of polarization computed from CoPol and XrPol gates having equal widths and equal depths. |
| $\Theta$ | Step function. $\Theta(X) = 0$, if $X < 0$. $\Theta(X) = 1$, if $X \geq 1$. |
| $\delta$ | Dirac delta function. $\delta(X)$ has a width of zero and an area of 1, so that, given a continuous function $F(X)$: $\int_A^B F(X)\delta(X - X_0)dX = F(X_0)$, if $A < X_0 < B$, and zero otherwise |
| $d_{pol}$ | Proportionality constant that relates the forward scattering to the exponential depolarization rate, wherein the proportionality constant is medium dependent. |
| $b_F$ | Forward scattering rate |
| $C_{obj}$ | Contrast reduction factor of an object in the medium. $C_{obj}$ is primarily due to forward-scattering blur |
| G | Gain of an image intensifier or other optical device used to gate an imager |
| DOLP | Degree of linear polarization |
| DOCP | Degree of circular polarization |
| DOP | Degree of Polarization. Generically refers to either DOLP or DOCP. |
| K | Attenuation rate of a light beam propagating in the medium, summed over all polarizations. This is the exponential rate exp(-Kz) at which a forward-propagating beam appears to dim with distance. K depends on the source geometry: K for a narrow laser beam will generally not be identical to K for sunlight. |
| K-value | The value of either K or $K_{DOLP}$ |
| K-char | A mode of the system in which it collects data to characterize K of the environment |
| $K_{DOLP}$ | Depolarization rate that represents the decay constant of polarization as light depolarizes through a medium |
| $K_{in\_Stride}$ | The value of K estimated using the in-stride algorithm |
| Nom1 | First Nominal Depth. |
| Nom2 | Second Nominal Depth. |
| PZ_from_DEq | The polynomial relating depth Z to DEq. This can be of any order. Our exemplary cases use first and third order polynomials. |
| SNCR | Signal to Noise and Clutter Ratio |

The basic mathematics of range-from-polarization computation is described as follows: The LIDAR background-return impulse responses ($R_{Bgd,Co}$ for co-polarized and $R_{Bgd,Xr}$ for cross-polarized relative to the transmitted light) from the scattering medium and an opaque boundary (such as the bottom of an ocean) are:

$$R_{Bgd,Co}(z) = I_{Transmitted} \times \qquad \text{Equation (1)}$$
$$[\rho_W(z)\exp(-2Kz)D_{Co}(z)\Theta(z_{Bott} - z) +$$
$$\rho_{Bott}\exp(-2Kz_{Bott})D_{Co}(z_{Bott})\delta(z_{Bott} - z)],$$

with $$D_{Co}(z) = \frac{1}{2}[1 + \exp(-2d_{Pol}b_F z)] \qquad \text{Equation (2)}$$

for the co-polarized background return, and:

$$R_{Bgd,Xr}(z) = I_{Transmitted} \times [\rho_W(z)\exp(-2Kz)D_{Xr}(z)\Theta(z_{Bott} - z) + \qquad \text{Equation (3)}$$
$$\rho_{Bott}\exp(-2Kz_{Bott})D_{Xr}(z_{Bott})\delta(z_{Bott} - z)],$$

with $$D_{Xr}(z) = \frac{1}{2}[1 - \exp(-2d_{Pol}b_F z)] \qquad \text{Equation (4)}$$

for the cross-polarized background return. The range z is to be understood as a propagation distance in the medium of interest, and is not necessarily in the vertical direction. For example, the range z may be horizontal or at an incline for a vehicle-borne LIDAR system. Likewise, the range to an opaque boundary $z_{Bott}$ may be the range to the ground (when the platform is over land) or bottom (when the platform is over sea), the range to a vertical boundary such as a wall or cliff, or any other opaque boundary.

The medium reflectance-per-unit-range pw depends on the turbidity of the medium, and may also depend on range z in optically-stratified media. In Equation (1) and Equation (3), the opaque-boundary is assumed to be de-polarizing (a typical condition), so that the reflectance $\rho_{Bott}$ is equal for both polarization directions. For boundaries which have partially-depolarizing reflectance, Equation (1) and Equation (3) would be modified to include separate reflectance for each polarization direction. The relative magnitudes of the co-polarized and cross-polarized reflectance can be determined empirically from LIDAR returns straddling or stepping through the boundary. The intensity of the beam at range z=0 is given by $I_{Transmitted}$. As the light propagates in the medium, it is attenuated exponentially with a decay constant K, so that the two-way attenuation is exp(−2 Kz). In addition to attenuation, the medium also scatters the propagating light. Via multiple forward scatterings, an initially polarized beam is depolarized, so that the DOP decays exponentially with decay constant $d_{Pol} \times b_F$, where $b_F$ is the forward-scattering coefficient of the medium, and $d_{Pol}$ is the depolarization rate constant. For seawater, the value of $d_{Pol}$ is approximately ½. Other scattering media may have different values for $d_{Pol}$, which can be determined empirically by measuring the DOP versus range in the medium.

The total background return $R_{Bgd,T}$ (co-polarized plus cross-polarized) is proportional to the sum of water and background reflectance weighted by the exponential attenuation:

$$R_{Bgd,T}(z)/I_{Transmitted} = R_{Bgd,Co}(z) + R_{Bgd,Xr}(z) = \quad \text{Equation (5)}$$
$$[\rho_W(z)\exp(-2Kz)\Theta(z_{Bott} - z) + \rho_{Bott}\exp(-2Kz_{Bott})\delta(z_{Bott} - z)].$$

An object embedded in the medium contributes positive reflection signal and negative shadow signals to the LIDAR returns according to:

$$R_{Obj,Co}(z)/I_{TRansmitted} \approx [\rho_{Obj}D_{Co}(z_{Obj})\delta(z_{Obj} - z) - \quad \text{Equation (6)}$$
$$\rho_W(z)D_{Co}(z)\Theta(z - z_{Obj})\Theta(z_{Bott} - z) -$$
$$\rho_{Bott}D_{Co}(z_{Bott})\delta(z - z_{Bott})]C_{Obj}(z)\exp(-2Kz).$$

Likewise, the XrPol LIDAR return is:

$$R_{ObjXr}(z)/I_{TRansmitted} \approx [\rho_{Obj}D_{Xr}(z_{Obj})\delta(z_{Obj} - z) - \quad \text{Equation (7)}$$
$$\rho_W(z)D_{Xr}(z)\Theta(z - z_{Obj})\Theta z_{Bott} - z) -$$
$$\rho_{Bott}D_{Xr}(z_{Bott})\delta(z - z_{Bott})]C_{Obj}(z)\exp(-2Kz).$$

The step function $\Theta(z)$ is given by:

$$\Theta(z) = \begin{cases} 1, & z \geq 0 \\ 0, & z < 0 \end{cases}. \quad \text{Equation (8)}$$

$C_{Obj}(z)$, which is in the range between zero and one, is a blur-induced contrast reduction factor, which depends on object size and the scattering properties of the medium. $C_{Obj}(z)$ can be determined empirically from LIDAR data, or it can be modeled from first principles. As with the opaque-boundary reflectance, the object reflectance will commonly be independent of polarization, so that $$R_{Obj,Xr}(z) = R_{Obj,Co}(z) \quad \text{Equation (9)}.$$

In cases in which the object does not completely depolarize the reflected light, separate reflectance for co-polarization and cross-polarization would be used in place of $\rho_{Obj}$.

Range-Gated Polarized Imaging

Equations (1) through (9) refer to impulse response: the idealized signals obtained from transmitting a pulse of infinitesimal width and detecting the returned light with a receiver having infinite bandwidth. In real systems, the transmitted light pulses have finite widths, and the receivers have finite time resolution, producing range-gated signals. Generally, a range-gated LIDAR image is produced when an imaging LIDAR system is set to accept photons from a finite span of time delays. The time delays are typically measured relative to the time of the peak light-transmission of the illuminating laser. For standard range-gating, the imagers are turned on at a time delay $t_1$, which corresponds to a range $z_1$, and turned off at a time $t_2$ which corresponds to a range $z_2$, with an imager response and gain held as uniform as possible over the time interval. The total LIDAR returns in the co-polarized and cross-polarized channels are the sum of the background and object returns, integrated over the range gate. For the case of objects suspended in the medium, with a range gate that does not straddle the boundary, the total returns are:

$$R_{Co}(z_{Obj}) = G \times \int_{z_1}^{z_2} dz [R_{Bgd,Co}(z) + R_{Obj,Co}(z)] = \quad \text{Equation 10)}$$

$$G \times I_{Transmitted} \times \int_{z_1}^{z_2} dx \exp(-2Kz)\{\rho_W(z)D_{Co}(z)$$

$$[1 - \Theta(z - z_{Obj})C_{Obj}(z)] + \rho_{Obj}D_{Co}(z_{Obj})\delta(z_{Obj} - z)C_{Obj}(z)\}.$$

and $$R_{Xr}(z_{Obj}) = G \times I_{Tramsitted} \times \quad \text{Equation (11)}$$

$$\int_{z_1}^{z_2} dx \exp(-2Kz)\{\rho_W(z)D_{Xr}(z)[1 - \Theta(z - z_{Obj})C_{Obj}(z)] +$$

$$\rho_{Obj}D_{Xr}(z_{Obj})\delta(z_{Obj} - z)C_{Obj}(z)\}.$$

In Equation (10) and Equation (11), the gain G is assumed to be constant over the gate time. In real gated imagers, the gain will ramp up at the start, remain steady for an operator-specified time, and then ramp down at the end of the gate. In conventional range-gated LIDAR, the ramp-up and ramp-down are designed to be as fast as possible, and any gain variation over time is considered a nuisance to be minimized. The present disclosure exploits the finite ramp-up and ramp down times to produce continuous (as opposed to piecewise continuous) functions relating range to DOLP. Continuous functions allow more stable and reliable computations. Given identical gate durations between the CoPol and XrPol channels, the DOP is then given by:

$$DOP(z_{Obj}) = \frac{[R_{Co}(z_{Obj}) - R_{Xr}(z_{Obj})]}{[R_{Co}(z_{Obj}) + R_{Xr}(z_{Obj})]}, \quad \text{Equation (12)}$$

where $$[R_{Co}(z_{Obj}) - R_{Xr}(z_{Obj})] \approx G \times I_{Transmitted} \times \quad \text{Equation (13)}$$

$$\left[\int_{z_1}^{z_2} dz \exp(-2Kz)\rho_W(z)\exp(-2d_{Pol}b_F z)[1 - \Theta(z - z_{Obj})C_{Obj}(z)] +\right.$$

$$\left. \rho_{Obj}\exp(-2d_{Pol}b_F z_{Obj})C_{Obj}(z)\right],$$

and $$[R_{Co}(z_{Obj}) + R_{Xr}(z_{Obj})] \approx G \times I_{Transmitted} \times \quad \text{Equation (14)}$$

$$\left\{\int_{z_1}^{z_2} dz \exp(-2Kz)\rho_W(z)[1 - \Theta(z - z_{Obj})C_{Obj}(z)] + \rho_{Obj}C_{Obj}(z_{Obj})\right\}.$$

Equation (12) gives a relationship between a DOP and the range to object, bounded by the starting and ending ranges $z_1$ and $z_2$. Thus, it gives a more-precise range to target than a conventional gated LIDAR, which could only show that the object is somewhere in the gate. In principle, the DOP-vs-range curve could be used to also compute a range to each pixel in the image, yielding a three-dimensional (3D) shape estimate. In practice, using DOP alone can yield a fuzzy shape, due to the relatively small slopes of the $D_{Xr}$ and $D_{Co}$ curves, which give small changes in DOP over centimeter-scale differences in range across a typical object of interest. More precision can be obtained by manipulating the intra-gate responses of the polarization channels, as well as by manipulating the width of the polarized-laser pulse used to illuminate objects through the scattering medium.

The sensitivity of DOP-based ranging can be increased by deliberately varying the gains over the gate duration, so as to amplify the sensitivity-versus-range trends provided by the de-polarizing effects of the scattering medium.

A basic model of gain-modulated polarized LIDAR returns is given by integrating the gain-weighted impulse responses over the durations of the CoPol and XrPol gates. With an exemplary linear-gain function, the CoPol channel yields:

$$R_{Co}(z_{Obj}) = I_{Transmitted} \times \int_{z_1}^{z_2} dz \exp(-2Kz) G_{Co}(z) \{\rho_w(z) D_{Co}(z) \quad \text{Equation (15)}$$

$$\left\{ \begin{array}{c} [1 - \Theta(z - z_{Obj}) C_{Obj}(z)] + \\ \rho_{Obj} D_{Co}(z_{Obj}) \delta(z_{Obj} - z) C_{Obj}(z) \end{array} \right\},$$

with:

$$G_{Co}(z) = G_{Co,start} + s_{Co}(z - z_{t,Co}) \quad \text{Equation (16),}$$

and $$s_{Co} = \frac{(G_{Co,end} - G_{Co,start})}{(Z_{2,Co} - Z_{1,Co})}. \quad \text{Equation (17).}$$

Likewise, for the XrPol channel, $$R_{Xr}(z_{Obj}) = I_{Transmitted} \times \int_{z_1}^{z_2} dz \exp(-2Kz) G_{Xr}(z) \quad \text{Equation (18)}$$

$$\left\{ \begin{array}{c} \rho_w(z) D_{Xr}(z)[1 - \Theta(z - z_{Obj}) C_{Obj}(z)] + \\ \rho_{Obj} \delta(z_{Obj} - z) C_{Obj}(z) \end{array} \right\},$$

with:

$$G_{Xr}(z) = G_{Xr,start} + s_{Xr}(z - z_{t,Xr}) \quad \text{Equation (19),}$$

and $$s_{Xr} = \frac{(G_{Xr,end} - G_{Xr,start})}{(z_{2,Xr} - z_{1,Xr})}. \quad \text{Equation (20)}$$

For the CoPol channel, a negative value for the gain slope $S_{Co}$ will amplify the decrease of signal with depth and for the XrPol channel, a positive slope amplifies the relative increase of signal level with range in accordance with the following equations:

$$R_{Co}(z_{Obj}) = I_{Trnasmitted} \times \quad \text{Equation (21)}$$

$$\begin{cases} \int_{z_{1,Co}}^{z_{2,Co}} dz \exp(-2Kz) G_{Co}(z) \rho_W(z) D_{Co}(z) C_{Obj}(z), & z_{Obj} < z_{1,Co} \\ \left[ \begin{array}{c} \exp(-2K z_{Obj}) G_{Co}(z_{Obj}) \rho_{Obj} C_{Obj}(z_{Obj}) + \\ \int_{z_{1,Co}}^{z_{Obj}} dz \exp(-2Kz) G_{Co}(z) \rho(\rho_W(z) D_{Co}(z) C_{Obj}(z) \end{array} \right], & z_{1,Co} < z_{Obj} < z_{2,Co} \\ 0, & z_{Obj} > z_{2,Co} \end{cases}$$

$$R_{Xr}(z_{Obj}) = I_{Transmitted} \times \quad \text{Equation (22)}$$

$$\begin{cases} \int_{z_{1,Xr}}^{z_{2,Xr}} dz \exp(-2Kz) G_{Xr}(z) \rho_w(z) D_{Xr}(z) C_{Obj}(z), & z_{Obj} < z_{1,Xr} \\ \left[ \begin{array}{c} \exp(-2K z_{Obj}) G_{Xr}(z_{Obj}) \rho_{Obj} C_{Obj}(z_{Obj}) + \\ \int_{z_{1,Xr}}^{z_{Obj}} dz \exp(-2Kz) G_{Xr}(z) \rho_w(z) D_{Xr}(z) C_{Obj}(z) \end{array} \right], & z_{1,Xr} < z_{Obj} < z_{2,Xr} \\ 0, & z_{Obj} > z_{2,Xr} \end{cases}$$

For the case in which the gates are chosen to have the start and end times set equal, so that $z_{1,Xr}=z_{1,Co}=z_1$ and $z_{2,Xr}=z_{2,Co}=z_2$; and for a completely de-polarizing target within the gate, the gain-enhanced DOP is given by:

$$DOP(z_{Obj}) = \frac{[R_{Co}(z_{Obj}) - R_{Xr}(z_{Obj})]}{[R_{Co}(z_{Obj}) + R_{Xr}(z_{Obj})]} \approx \quad \text{Equation (23)}$$

$$\frac{\left[ \begin{array}{c} \rho_{Obj}(G_{Co}(z_{Obj}) - G_{Xr}(z_{Obj})) + \\ \int_{z_1}^{z_{Obj}} dz \exp(-2K(z - z_{Obj})) \rho_W(z) (G_{Co}(z) D_{Co}(z) - G_{Xr}(z) D_{Xr}(z)) \end{array} \right]}{\left[ \begin{array}{c} \rho_{Obj}(G_{Co}(z_{Obj}) - G_{Xr}(z_{Obj})) + \\ \int_{z_1}^{z_{Obj}} dz \exp(-2K(z - z_{Obj})) \rho_W(z) (G_{Co}(z) D_{Co}(z) - G_{Xr}(z) D_{Xr}(z)) \end{array} \right]}.$$

In Equation (23), the forward-scattering contrast-reduction factor $C_{Obj}(z)$ has been assumed to vary little between object reflections (the terms proportional to $\rho_{Obj}$ and partially-shadowed water reflection (the terms proportional to $\rho w$) modes, so that $C_{Obj}(z) \approx C_{Obj}(z_{Obj})$ in the range gate. For extremely clear water ($\rho w \ll \rho_{Obj}$), and short laser gates, Equation (23) further reduces to:

$$DOP(z_{Obj}) \approx \frac{[G_{Co}(z_{Obj}) - G_{Xr}(z_{Obj})]}{[G_{Co}(z_{Obj}) + G_{Xr}(z_{Obj})]}. \quad \text{Equation (24)}$$

One noteworthy aspect of Equation (24) is that the relationship between DOP and $z_{Obj}$ is insensitive to the intensity of the illuminator, or to the absolute reflectance of the object of interest, so that when the medium backscatter interference (BSI) is small, the shape of an object can be determined just from a lookup table, without first characterizing the BSI.

Some cases of interest are those in which the BSI is not negligible. In such cases, BSI reduces the contrast of the object versus the background, and reduces the contrast between polarization channels. In accordance with one exemplary implementation, first consider the case of gains set equal and constant (i.e., not slewed):

$$DOP(z_{Obj}) \approx \frac{\begin{bmatrix} \exp(-2Kz_{Obj})\rho_{Obj}(G_{Co}(z_{Obj}) - G_{Xr}(z_{Obj})) + \\ \int_{z_1}^{z_{Obj}} dz \exp(-2Kz)\rho_w(z)(G_{Co}(z)D_{Co}(z) - G_{Xr}(z)D_{Xr}(z)) \end{bmatrix}}{\begin{bmatrix} \exp(-2Kz_{Obj})\rho_{Obj}(G_{Co}(z_{Obj}) - G_{Xr}(z_{Obj})) + \\ \int_{z_1}^{z_{Obj}} dz \exp(-2Kz)\rho_w(z)(G_{Co}(z)D_{Co}(z) - G_{Xr}(z)D_{Xr}(z)) \end{bmatrix}} \approx$$

$$\frac{(\exp(2(K+d_{Pol}b_F)(z_{Obj}-z_1))-1)}{\left[4K\frac{\rho_{Obj}}{\rho_W}+(\exp(2K(z_{Obj}-z_1))-1\right]}\exp(-2(d_{Pol}b_f)z_{Obj}) \approx$$

$$\frac{(1+d_{Pol}b_F/K)(z_{Obj}-z_1)}{\left[2\frac{\rho_{Obj}}{\rho_W}+(z_{Obj}-z_1)\right]}\exp(-2(d_{Pol}b_F)z_{Obj}) \approx$$

$$(1+d_{Pol}b_F/K)\frac{\rho_W}{2\rho_{Obj}}(z_{Obj}-z_1)\exp(-2(d_{Pol}b_F)z_{Obj}).$$

Equation (25) shows that, if the gains are equal for all polarizations, and for the case of an object much more reflective than the medium, the DOP has a simple dependence on range to the object, and is gain-independent. Because the medium reflectance over a gate length $\rho w(z_2 - z_1)$ is typically lower than $\rho_{Obj}$, this provides a relatively small signal that is best exploited by averaging over an extended area of the object of interest. The sensitivity $\Delta z$ to a change $\Delta DOP$ in DOP can be estimated from:

$$\Delta DOP = [DOP(z+\Delta z) - DOP(z)] \approx \qquad \text{Equation (26)}$$

$$(1+d_{Pol}b_F/K)\frac{\rho_W}{2\rho_{Obj}}\left\{\begin{array}{l}\Delta z \exp(-2(d_{Pol}b_F)\Delta z + \\ (z_1-z)[1-\exp(-2(d_{Pol}b_F)\Delta z)]\end{array}\right\}$$

$$\exp(-2(d_{Pol}b_F)z) \approx (1+d_{Pol}b_F/K)\Delta z \exp(-2(d_{Pol}b_F)z),$$

so that for fine range discrimination (small $\Delta z$):

$$\Delta z = \frac{2\rho_{Obj}}{\rho_W}\frac{\Delta DOP}{(1+d_{Pol}b_F/K)}\exp(+2(d_{Pol}b_F)z). \qquad \text{Equation (27)}$$

Because the factor ($2\rho_{Obj}/\rho w$) is typically much greater than one, fine discrimination of changes in DOP is required to achieve fine range resolution. In addition, due to the exponential factor in Equation (27), the required DOP precision becomes finer with increasing depth.

Some systems and methods increase the sensitivity of polarimetric ranging to make it more exploitable for 3D shape estimation. To increase range sensitivity, Equation (23) suggests two methods to deal with BSI: (1) vary or slew the gains of the first range-gated imager and the second range-gated imager so as to minimize the BSI effect on DOP, providing higher contrast versus the background; or (2) vary or slew the gains of the first range-gated imager and the second range-gated imager so as to amplify the slope of the apparent DOP-versus range, providing greater sensitivity.

One method is optimized if the gains can be slewed so that $$G_{Co}(z)D_{Co}(z)=G_{Xr}(z)D_{Xr}(z)=g \qquad \text{Equation (28),}$$

independent of z for all z such that $z_1 \leq z \leq z_2$. Then Equation (23) reduces to:

$$DOP(z_{Obj}) \approx \frac{[G_{Co}(z_{Obj}) - G_{Xr}(z_{Obj})]}{\begin{bmatrix}(G_{Co}(z_{Obj}) + G_{Xr}(z_{Obj})) + \\ \frac{2g}{\exp(-2Kz_{Obj})\rho_{Obj}}\int_{z_1}^{z_{Obj}} dz \exp(-2Kz)\rho_w(z)\end{bmatrix}} \approx \qquad \text{Equation (29)}$$

$$\frac{[G_{Co}(z_{Obj}) - G_{Xr}(z_{Obj})]}{\left[(G_{Co}(z_{Obj}) + G_{Xr}(z_{Obj})) + \frac{g}{K}\frac{\rho_W}{\rho_{Obj}}(\exp(-2K(z_{Obj}-z_1))-1)\right]}.$$

In Equation (29), the medium reflectance has been taken to vary little with depth, a typical condition, to show clearly that water backscatter can be nearly eliminated by setting the gate-start depth $z_1$ to be close to the range to the nearest portion of the object. The range-to-DOP relationship then simplifies to:

$$DOP(z_{Obj}) \approx \frac{[G_{Co}(z_{Obj}) - G_{Xr}(z_{Obj})]}{\left[(G_{Co}(z_{Obj}) + G_{Xr}(z_{Obj})) - 2g\frac{\rho_W}{\rho_{Obj}}(z_{Obj}-z_1)\right]}, \qquad \text{Equation (30)}$$

which will give small corrections to the BSI-free Equation (24). By raising the gains of both channels, while assuring they meet the condition of Equation (28), the sensitivity of DOP to range can be increased, and the BSI further suppressed. The sensitivity of Equation (30) is determined by the depolarization rate of the medium. For target reflectance much greater than the water reflectance, $$DOP(z_{Obj})=[D_{Xr}(z_{Obj})-D_{Co}(z_{Obj})]\approx -\exp(-2d_{Pol}b_Fz_{Obj}) \qquad \text{Equation (31).}$$

For 3D shape determination, the derivative of the DOP-versus range is:

$$\frac{\partial}{\partial z}DOP(z) \approx 2d_{Pol}b_F\exp(-2d_{Pol}b_Fz), \qquad \text{Equation (32)}$$

so that the sensitivity $\Delta z$ to a change $\Delta DOP$ in DOP is:

$$\Delta z = \frac{\Delta DOP}{2d_{Pol}b_F}\exp(+2d_{Pol}b_Fz). \qquad \text{Equation (33)}$$

Comparing Equation (33) to Equation (27) shows that slewing the gain to equalize the BSI measured in the different polarization channels improves the range sensitivity. This is because the factor $1/(2d_{Pol}b_F)$ is typically much smaller than the factor ($2\rho_{Obj}/\rho w$), so that smaller $\Delta DOP$ is required to achieve a given range resolution $\Delta z$.

If it is not possible to slew the gains precisely enough to cancel the BSI, or if the depolarization of the BSI is not known, other gain-slewing methods can be employed. For example, in another method, the gains are slewed so as to exaggerate, rather than suppress, the polarization-versus-depth dependence. This produces a stronger, though more complicated DOP-versus-range relationship than Equation (31), since Equation (23) now retains all of the water-backscatter terms. The extra complexity is shown by an exemplary case, with the co-polarized gain falling linearly from an initial gain of $G_0$ at depth $z_1$ to zero at depth $z_2$, while the cross-polarized gain rises from zero at depth $z_1$ to $G_0$ at depth $z_2$, so that:

$$G_{Co}(z) = \begin{cases} 0, & \text{for } z < z_1 \text{ or } z > z_2 \\ \frac{(z_2 - z)}{(z_2 - z_1)} G_0, & \text{for } z_1 < z < z_2 \end{cases} \quad \text{Equation (34)}$$

and $$G_{Xr}(z) = \begin{cases} 0, & \text{for } z < z_1 \text{ or } z > z_2 \\ \frac{(z - z_1)}{(z_2 - z_1)} G_0, & \text{for } z_1 < z < z_2 \end{cases} \quad \text{Equation (35)}$$

Since the precision of ranging to pixels on the object depends on the net slope of the DOP-vs-range curve, Equation (34) and Equation (35) provide higher sensitivity than Equation (28), but at the expense of increasing the BSI accepted in the DOP. Thus, modeling via Equation (23), or a similar model, is typically needed to create the lookup-tables for accurate 3D shape determination. The model parameters K and $d_{Pol}/b_F$ can be determined from analyzing polarimetric LIDAR data obtained by stepping narrow gates through the water background to collect BSI data, and measuring relative intensities versus depth of CoPol and XrPol BSI. In addition to analytic models like Equation (23), optical simulations, such as Monte-Carlo simulations and ray-tracing methods, can be used to generate precise DOP versus range look up tables. If the slopes are monotonic, but not linear, the range is given by a look-up table relating delay time to DOP. As long as the responses are monotonic versus range, the processing to determine shape is extremely quick and efficient.

In addition to entities in the water column such as, for example, underwater vehicles and other items of interest, the object to be ranged to can include the bottom of the body of water, effecting a three-dimensional mapping application. This relies on characterizing the relative depolarizing reflectances (e.g., co-polarized (CoPol) versus cross-polarized (XrPol)) of the bottom, either from historical data of known bottom types, from modeling, or from data collected with the narrow polarimetric gates set to equal ranges. With the relative polarimetric reflectances of the bottom known, the polarimetric gates would be widened to include both bottom and a significant water reflectance component. The combined water plus bottom DOP is related to bottom depth via Equation (11). Three-dimensional mapping in accordance with the present disclosure utilizes cheaper equipment compared to equipment required for standard bottom-mapping LIDAR. Further, three-dimensional mapping in accordance with the present disclosure provides simultaneous high-resolution data over a wide area, and can thus be faster than standard bottom-mapping LIDAR.

FIG. 1 depicts a laser imaging detection and ranging (LIDAR) system generally at 10. More particularly, system 10 may be considered an ocean LIDAR polarimetry system 10 to detect objects below the surface of a fluid (i.e., subsurface). System 10 may include a mobile platform 12, a light beam generator or LASER beam-projector assembly 14, which may also be referred to as beam-projector assembly, and a polarization-sensitive sensor or set of polarization-sensitive sensors 16 (which may also be referred generally to as a sensor, receiver circuitry, imager, or imaging sensor), a polarized laser beam 18 transmitted by the beam-projector assembly 14 and reflected signal radiation 19, which may also be referred to as radiation or light, from an object 22. The sensor may be a polarization-sensitive optical system with one or more imaging planes, or a set of such systems, such as, for example, a telescope with beam-splitting optics that direct light to two image planes sensitive to orthogonal polarizations of light. In one particular embodiment, the polarized beam 18 is directed downwardly into a fluid 20, such as the ocean or seawater, and the reflected radiation 19 is used to detect any object 22 that is located below the surface of the fluid 20. In one particular instance, the object 22 that is to be detected by system 10 is an object of interest. Notably, a LIDAR system incorporates a LASER with beam-projector optics, as well as one or more sensors, as well as electronics and software to coordinate the lasers and sensors and to capture the images. In other scenarios, the fluid 20 can be air and the reflected radiation 19 is used to detect any object 22, such as the ground surface. In one particular instance, the object 22 that is to be detected by system 10 is an object of interest.

Mobile platform 12 may be any moveable platform configured to carry the beam-projector assembly 14 and the polarization-sensitive sensor 16. In one particular embodiment, mobile platform 12 flies above the surface of the fluid 20 such that the beam-projector assembly 14 directs the beam 18 downwardly first through the air and then through the fluid 20. Mobile platform 12 may be any airborne vehicle, such as a helicopter, unmanned aerial vehicle (UAV), plane, or other aircraft either manned or unmanned. However, it is to be understood that the mobile platform 12 does not need to be an airborne platform. For example, the mobile platform 12 may be a vessel, unmanned underwater vehicle (UUV) or towed device that floats on or is submerged in the fluid 20, that is either manned or unmanned, and carries the beam-projector assembly 14 and the polarization-sensitive sensor 16. In this instance, the polarized beam 18 generated by the beam-projector assembly 14 may not travel through air or the atmosphere prior to traveling through the fluid 20.

The LIDAR system 10 carried by the mobile platform 12 may include electronic circuitry to effectuate the generation of the beam 18 in order to survey distances to a target, such as the object 22 or the ocean floor 24, by illuminating that target (such as a submerged object or the bottom of the medium or seabed) with the polarized beam 18. The polarized light of beam 18 depolarizes at a finite rate as it moves through a multiple-scattering fluid 20. Backscatter tends to preserve polarization, so that a polarized beam backscattered from the scattering medium as the reflected radiation 19 is still polarized. The backscattered light depolarizes further as the beam transits the medium on the return path to the sensor, so that the net depolarization accumulates over the two-way path. For seawater, the depolarization rate is relatively slow, typically resulting in a decay of a completely polarized beam to 1/e polarization after approximately seven scattering lengths. In clear ocean water, seven scattering lengths can be 100 feet or more. The range can be longer if the power-aperture product of the LIDAR is high enough. More power-aperture equals more range precision. The depolarization rate is likely to be at least as long for circularly polarized light and elliptically polarized light as for linearly polarized light. The ocean bottom 24 and many objects 22 depolarize the reflected light upon reflection. The depolarized reflections from the objects 22 of interest and the sea bottom 24 provide a means for discriminating objects of interest from water backscatter. Glints from surface returns are co-polarized with the laser. Thus, polarization of reflected light 19 can also be used to separate glints from objects of interest. Additional polarization information can be obtained with additional polarization-sensitive sensors at different polarizations, such as +/−45 degrees. The laser may also be circularly polarized, with the two polarization-sensitive sensors circularly polarized opposite each other, and elliptically polarized, with two polarization-sensitive sensors elliptically polarized opposite each other.

Typically, when using airborne imaging LIDAR to image underwater targets, the targets near the surface of the fluid 20 may be obscured by glints. Glints in the fluid 20 refer to small reflective flashes of light from mirror-like surfaces that interrupt the beam 18 and confuse or cause other difficulties for the polarization-sensitive sensor 16 in determining the return feedback of the laser beam in order to accurately map the target such as generating a 3D mapping of the ocean floor. The present disclosure addresses this concern by incorporating the polarization-sensitive sensor 16 that is polarized relative to the beam 18 to provide glint-free imaging for near surface objects. The use of a polarization-sensitive receiver exploits the fact that the linear polarization of a glint is the same direction as that of the incident light, while the direction of circularly polarized light in a glint is opposite that of the incident light.

The polarization-sensitive sensor 16 is a device carried by the mobile platform 12 that reads and records the return or reflected signal radiation 19 being returned to the LIDAR system 10 that is received by the polarization-sensitive sensor 16. The polarization-sensitive sensor 16 and the beam projector assembly 14 are typically co-located so as to have substantially overlapping fields of view and co-aligned look directions.

In one implementation, the polarization-sensitive sensor 16 may be a solid state detector, such as a silicon avalanche photo diode (APD). In another implementation, the polarization-sensitive sensor 16 may be a photo multiplier tube (PMT) or a streak-tube; however, the polarization-sensitive sensor 16 may be any suitable polarization-sensitive sensor. Regardless of the type of polarization-sensitive sensor 16 implemented, it is polarized relative to the laser beam. In one particular embodiment, two polarization-sensitive sensors 16 are utilized, one of which is co-polarized (CoPol) while the other is cross-polarized (XrPol). The system 10 of the present disclosure measures the depolarization of the reflected radiation 19 in the fluid 20. The depolarization rate of the reflected radiation 19 sensed by the polarization-sensitive sensor 16 relative to the polarized beam 18 generated by the beam-projector assembly 14 is about 7 scattering lengths, which is typically about 80 feet in seawater, but can be up to 100 feet or more in clear seawater. Reflected radiation 19 from the bottom or ocean floor 24 empirically behaves as expected and the ocean floor 24 depolarizes the beam 18 almost completely.

Because the bottom 24 or objects 22 in the water column or fluid column depolarize the reflected radiation 19 while backscatter reflection from the fluid itself preserves polarization, the contrast of the objects 22 from the reflected radiation 19 versus reflections from the water background is very high, even at low signal levels. This greatly increases the signal to noise and clutter ratio (SNCR) for detecting and classifying objects 22. Accordingly, a polarization-sensitive sensor 16 or set of polarization-sensitive sensors 16 may be coupled with the light generator (i.e., the polarized LASER beam-projector assembly 14) carried by the platform 12 flying above the fluid 20, wherein the light generator generates light (i.e., the beam 18) directed into the fluid 20. The sensor is coupled with scatter detection logic to sense scatter in the reflected radiation 19 having reflections from the object as well as from the fluid. Additionally, object detection logic may be coupled with the scatter detection logic to determine whether an object 22 is present in the fluid 20 based, at least in part, on the scatter in the reflected radiation 19.

With continued reference to FIG. 1, and in one example, system 10 characterizes the depolarization rate of the fluid. This requires a polarized light source (i.e., beam projector assembly 14) and two or more polarization-sensitive sensors 16, at least one of which is co-polarized (CoPol) with the laser and at least one of which is oppositely-polarized versus the laser. For water characterization, the polarization-sensitive sensors 16 are aligned to have overlapping (such as identical) fields of view. With respect to the overlapping fields of view, fully overlapping is ideal, but if the overlap is partial, then the system uses the partially overlapped portions of the images.

The polarization extinction ratios of orthogonal polarization directions, and the dynamic ranges of the polarization-sensitive sensors 16, should be sufficient to discriminate small polarizations of backscattered light. The sensors in one example are also gated or time-resolved, so that LIDAR-return intensity versus range can be measured for each polarization-sensitive sensor 16. The water 20 is characterized by collecting intensity-versus range from the reflected radiation 19 in the two polarization-sensitive sensors 16, and in one embodiment computing from their ratios (a) the depolarization rate of the medium versus time or distance, (b) the overall attenuation rate of light in the medium versus time or distance, and (c) the presence and depolarization properties of the sea bottom (if present). When computing the ratios, it may be advantageous because the system will not need to consider whether the laser power varies from shot to shot because the laser power will be divided out as a function of the ratio.

Alternatively, in another embodiment computing differences of (a) the depolarization rate of the medium versus time or distance, (b) the overall attenuation rate of light in the medium versus time or distance, and (c) the presence and depolarization properties of the sea bottom (if present). When computing the differences, it may be advantageous because the system may have an absolute or non-variable laser power that will not vary from shot to shot and subtraction or finding the difference will be sufficient.

System 10 uses the data from the characterization to set polarized-LIDAR sensor parameters (time delays, integration times, gains, etc.) so as to optimally measure the reflections of water, the sea bottom 24, and of any objects 22 intervening between the water surface and the sea bottom 24. Reflected signal radiation 19 from an object 22 will appear more cross-polarized (XrPol) than the water, compared to the water backscatter. The reflected signal radiation 19 from the object 22 will also appear less cross-polarized (XrPol) compared to the sea bottom 24. The discrimination of objects of interest versus the natural background can be done with both polarization-sensitive sensors 16 set to the same depths/ranges, or with them set to different depths/ranges.

Detection of objects 22 versus the water backscatter can also be accomplished with just one polarization-sensitive sensor 16 polarized oppositely, i.e., cross-polarized (XrPol), versus the transmitted beam. Operation with a single cross-polarized (XrPol) polarization-sensitive sensor 16 provides detection, due to the enhanced Signal-to-Noise-and-Clutter-Ratio (SNCR) of the depolarizing object versus polarized water backscatter, but provides more limited range-precision advantages over a standard unpolarized range-gated LIDAR system.

For this particular example of test results, the K-value for the co-polarized (CoPol) measurements is 0.11/m for a 30 ns gate. The K-value for the cross-polarized (XrPol) data is 0.08 per meter. The scattering layer above the ocean floor 24 is represented by box 26. Stated otherwise, two phenomena exploited by the present disclosure are: 1) the slow depolarization of LIDAR returns versus range and scattering, and 2) the complete depolarization of laser light reflected from the sea-bottom 24.

As will be described in greater detail herein, computation of a DOP versus range curve begins with characterizing the background medium. For water characterization, the polarization-sensitive sensors typically need to be aligned to have overlapping (such as identical or partial) fields of view. The extinction ratios of orthogonal polarization directions, and the dynamic ranges of the detectors must be sufficient to discriminate small polarizations of backscattered light. The sensors are also gated or time-resolved, so that LIDAR-return intensity versus range can be measured for each polarization-sensitive sensor. The water is characterized by collecting intensity-versus range in the two polarization-sensitive sensors, and computing from their ratios or differences (a) the depolarization rate of the medium versus time or distance, (b) the overall attenuation rate of light in the medium versus time or distance, and (c) the presence and depolarization properties of the sea bottom (if present).

When flying a platform over the ocean (such as for counter-mine missions) with polarimetric LIDAR, aspects of the system and method of the present disclosure are imaging through a turbid medium (seawater), and need to know the distance to the ocean bottom or beach to set LiDAR gates. It is highly desirable to do this in stride during the mission (i.e., while the platform is in motion), without breaking search to do a custom bathymetry survey. In one exemplary embodiment, four laser shots per scan are used to precisely determine depth. A further detail of this embodiment utilizes four laser shot per scan that are not used for search, and devised a method that uses any of these "throw away" or extra laser shots to precisely determine depth. The four shots are typically not used at all. They are a byproduct of the fact that LIDAR systems do not turn the laser on and off when changing the direction of the scan. This provides real time depth soundings per second that are used to reset the mine search gates. This method does not require in water assets (such as a sonar system), requires very little computational processing, and provides precise mapping in the range of approximately 1 foot. It also can be adapted for overland use, even using the altitude or depth finding techniques through fog or dust for determining altitude relative to the platform based on the characterization of the medium (i.e., air) containing the dust or fog.

The ocean bottom typically completely depolarizes the reflection of a laser beam, while water backscatter tends to retain polarization, for depths down to the de-polarization depth. The depolarization depth is typically seven scattering lengths, which is deeper than the bottom depths of the VSW (Very Shallow Water that is about 40 feet or less). For water deeper than VSW, the gate-setting strategy is independent of bottom depth. Set the CoPol and XrPol gates to be equal and width and straddling the last-known bottom depth, or the VSW depth, if the last known depth is deeper than VSW. If a depolarizing bottom is in the gate, the DOLP will be close to zero. A high-backscatter will exploit two pulses, each with two gates (Co and Xr), to refine bottom estimate. Table 1 (below) depicts scenarios of considerations for in-stride depth estimation.

TABLE 1

Considerations for In-Stride Depth Estimate with 2 shots per scan

| Bottom Location | Upper XrPol Brightness | Upper Gate DOLP | Lower XrPol Brightness | Lower Gate DOLP |
|---|---|---|---|---|
| Below both gates | Low and << CoPol | High | Low and << CoPol | High |
| In lower gate, below overlap | Low, and << CoPol | High | High and ≈ CoPol | Low |
| In overlap region | High and ≈ CoPol | Low | High and ≈ CoPol | Low |
| In upper gate, above overlap | High and ≈ CoPol | Low | Low and ≈ CoPol | Low |
| Above both gates | Any and ≈ CoPol | Low | Any and ≈ CoPol | Low |

Medium Characterization

For the system and method of the present disclosure, the VSW (Very Shallow Water) zone extends to depths of about 40 feet. The water clarity within this depth range can be highly variable from location to location. The present disclosure utilizes methods to optically characterize the water volume and sea-bottom by using dual-polarization LIDAR. One exemplary method is software-implemented in a set of environmental-characterization algorithms, calculations, or process, informed by a special data-collection mode known as "K-char" mode. An example of output from K-char mode is shown in FIG. 2.

Figure 2:
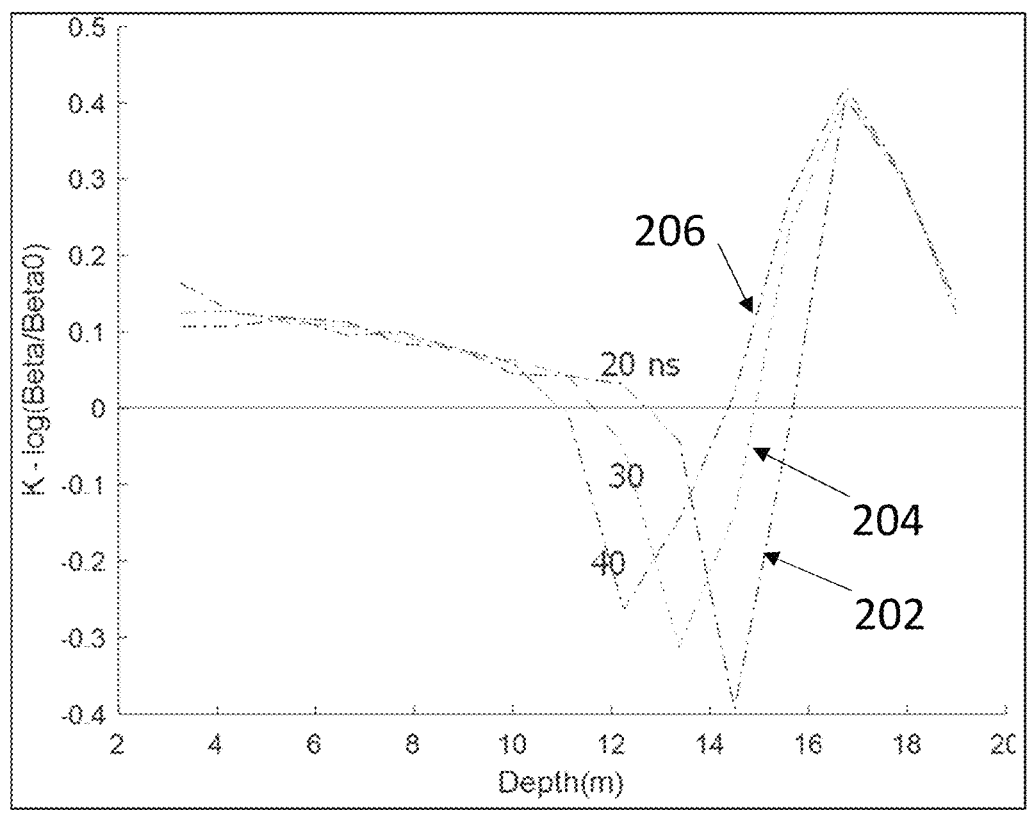
FIG. 2 is a graph depicting data from stepping lidar gates of various thicknesses (20 ns, 30 ns, and 40 ns) through the water column in environmental characterization "K-char" mode.

FIG. 2 depicts data from stepping LIDAR gates of various thicknesses (20 nanoseconds (ns), 30 ns, and 40 ns) through the water column (i.e., one exemplary medium) in environmental characterization "K-char" mode. The data from the gate thickness at 20 ns is represented by line 202. The data from the gate thickness at 30 ns is represented by line 204. The data from the gate thickness at 40 ns is represented by line 206.

FIG. 2 indicates that the data from narrower gates allow continuous fits of K versus depth (K-fits), which can interpolate to depths other than those sampled during Kchar mode, closer to the bottom than do thicker gates. In one exemplary collection of real word data, which was labeled in some embodiments as "Flight 16," K appears to decrease with depth, with not much evidence of near-bottom scattering layer. The mixing of light reflected from water and the bottom cause K to appear to plummet for depths near the bottom, at ~14.5 meters. For in-stride testing, the present disclosure considers 20-ns K-char data to provide "truth" data for algorithm validation.

One exemplary drawback to using K-char mode is that it requires interrupting a wide area search in order to collect data by stepping a set of narrow LIDAR gates successively in depth from near-surface to the deepest depth of interest. While the data collection itself only requires several seconds, search interruptions for K-char must be relatively infrequent, to optimize search efficiency. For example, when the platform 12 is flying over the ocean in an attempt to scan for underwater objects in the water. To set the LIDAR parameters optimally, system 10 needs to know what the K profile of the water is doing. For example, what is the K profile of the water where the platform 12 is located, or whether the K profile of the water changes with depth, or if the platform 12 is flying at a location where a river outlet meets the ocean which causes K profile to vary. The K profile can be determined from the K-char mode that steps the gates down through the water column, for example 1 meter at a time, and processing them to obtain the K profile. To solve the problem of obtaining the K profile fast enough, especially when platform 12 is flying along a coastal region of the ocean (where the K profile changes frequently due to natural variations like river outlets), the system 10 understands that K may change, and therefore performs continuous monitoring of the medium to determine when K changes using the continuous $K_{In\_Stride}$ using four shots to obtain depolarization rates. When K changes or deviates from a threshold parameter as determine by the continuous $K_{In\_stride}$, the system may then implement or perform another K-char mode operation to obtain an updated K profile at that location.

Because the medium or water clarity can vary significantly over a search area, especially as the search platform transits between deeper and shallower water, it is highly desirable to continuously update the water optical properties via an in-stride method. This system and method of present disclosure describes such a method, and presents validation data derived from previous real-world data collections. One exemplary method uses in-stride (i.e., in situ or real-time) "throw-away" shots collected during the fly back portions of the cross-track scan pattern, shots which would otherwise provide no useful data.

Figure 3:
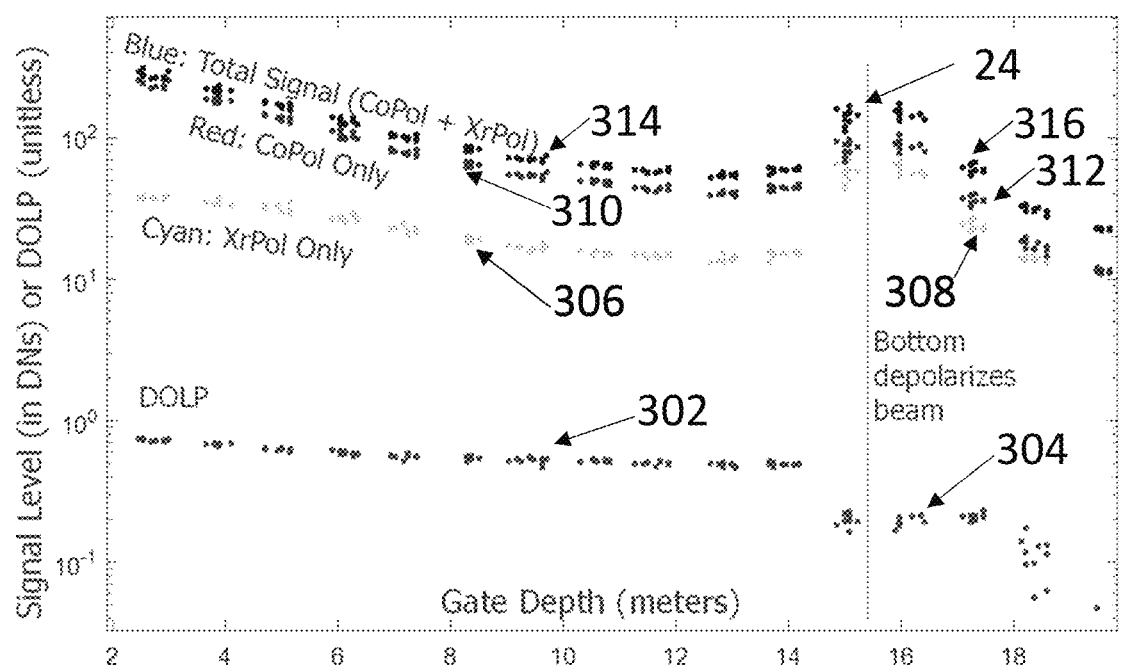
FIG. 3 is a graph depicting the effect of the sea bottom or sea floor on polarized LIDAR return.

FIG. 3 is a graph that depicts the effect of sea bottom on polarized LIDAR return. The reflected laser beam 19 is highly polarized at the sea surface. Polarization decreases slowly with increasing depth, until the sea bottom 24. The sea bottom 24 completely depolarized the reflected light, resulting in a discontinuous drop in the DOLP (degree of linear polarization) 302 as shown at 304. The results of the method is graphed in FIG. 3.

FIG. 3 depicts the signal level of the XrPol channel relative to the gate depth at 306 and how sea bottom 24 affects the signal level of XrPol channel at 308. Also depicted is the signal level of the CoPol channel relative to the gate depth at 310 and how sea bottom 24 affects the signal level of CoPol channel at 312. Also depicted is the signal level of the total signal (XrPol+CoPol) relative to the gate depth at 314 and how sea bottom 24 affects the total signal level at 316.

As can be seen in FIG. 3, LIDAR light fields in a medium can be described with log-normal statistics. The following paragraphs describe the log-normal statistics equations as well as summarizing the K-estimation, followed by a summary of the K-estimation algorithm for a single pair of images, then by a detailed explanation of the leaky-memory multi-shot algorithm.

If I is a gated-LIDAR image from underwater, with a mean intensity <I>, then its logarithm:

$$X = \ln\langle I \rangle \qquad \text{Equation (36)}$$

is Gaussian distributed with a probability distribution P(X) given by:

$$P(X(z)) = \frac{1}{\sigma_{LogN}\sqrt{2\pi}} \exp\left(\frac{1}{2}\frac{(X(z)-\mu_{LogN})^2}{\sigma_{LogN}^2}\right) \qquad \text{Equation (37)}$$

The value of $\mu_{Log\,N}$ is depth dependent due to the exponential attenuation of light in water:

$$\mu_{LogN}(z) = $$

$$\langle \ln(I(z)) \rangle = \ln(I_0) - 2\int_0^z dz' K_{True}(z') = \{\ln(I_0) - 2\,z\langle K_{True}(z)\rangle\} \qquad \text{Equation (38)}$$

where $\langle K_{True}(z) \rangle$ is the average K value from the surface to the depth z. Given Equation (36), the difference of X values between two different depths, $$X_{Diff} = [X(z_1) - X(z_2)] \qquad \text{Equation (39)}$$

is also Gaussian distributed, so that:

$$P(X_{Diff}) = \frac{1}{\sigma\sqrt{2\pi}} \exp\left(\frac{1}{2}\frac{(X_{Diff}-\mu)^2}{\sigma^2}\right), \qquad \text{Equation (40)}$$

with mean and standard deviation:

$$\mu = \langle X_{Diff}\rangle = [\mu_{Log\,N}(z_1) - \mu_{Log\,N}(z_2)] \approx$$
$$2\{z_2\langle K_{true}(z_2)\rangle - z_1\langle K_{True}(z_1)\rangle\}, \qquad \text{Equation (40)}$$

and $$\sigma = \sqrt{\text{var}(X_{Diff})} = \sqrt{\sigma_{LogN}(z_1)^2 + \sigma_{LogN}(z_2)^2}. \qquad \text{Equation (42)}$$

In terms of the mean K-value, $K_{In\text{-}Stride}$, between depths $z_1$ and $z_2$, Equation (41) reduces to:

$$\mu = 2(z_2 - z_1)K_{In\_stride}. \qquad \text{Equation (43)}$$

Empirically, the variances are approximately proportional to the square of the mean signal, so that:

$$\sigma = \sqrt{\sigma_{LogN}(z_1)^2 + \sigma_{LogN}(z_2)^2} \approx \qquad \text{Equation (44)}$$
$$\alpha_{Noise}\sqrt{\mu_{LogN}(z_1)^2 + \mu_{LogN}(z_2)^2} \approx$$
$$\alpha_{Noise}\sqrt{\langle \ln(I(z_1))\rangle^2 + \langle \ln(I(z_2))\rangle^2}.$$

where $\alpha_{Noise}$ depends on water clarity and sea state.

In the system and method of the present disclosure, timing is reliable, so the depths at which gates $z_1$ and $z_2$ started can be determined reliably. System 10 collects multiple image slices (i.e., data at many ranges with small range separations) and generates a data "cube" or "smart cube" based on the collected image slices. Smart cubes enable data from multiple sensors to be fused to obtain a georeferenced set of data that are localized in space. Assuming that the smart-cube depths are computed with negligible errors, then the noise is only in the image intensities, so that the statistics of $K_{In\text{-}Stride}$ are also Gaussian, with mean given by $$\langle K_{In\text{-}Stride}\rangle \approx \frac{\mu}{2(z_2-z_1)} = \qquad \text{Equation (45)}$$
$$\frac{[\mu_{LogN}(z_1)-\mu_{LogN}(z_2)]}{2(z_2-z_1)} = \frac{[\langle \ln(I(z_1))\rangle - \langle \ln(I(z_2))\rangle]}{2(z_2-z_1)},$$

and the variance of the K estimate given by:

$$\text{var}(K_{In-stride}) \approx \frac{(\sigma_{LogN}(z_1)^2 + \sigma_{LogN}(z_2)^2)}{4(z_2 - z_1)^2}. \quad \text{Equation (46)}$$

The means and variances of the (dark- and flat-corrected) image data are related to the parameters of the log-normal distribution by:

$$\langle I \rangle = \exp\left(\mu_{LogN} + \frac{1}{2}\sigma_{logN}^2\right), \quad \text{Equation (47)}$$

and $$\text{var}(I) = \{[\exp(\sigma_{log\,N}^2) - 1]\exp(2\mu_{Log\,N} + \sigma_{Log\,N}^2)\} = \alpha_{Log\,N}\langle I \rangle^2, \quad \text{Equation (48)}$$

Where:

$$\alpha_{Log\,N} = [\exp(\sigma_{log\,N}^2) - 1]. \quad \text{Equation (49)}$$

Empirically, $\alpha_{Log\,N}$ depends on sea state and mean turbidity, but varies slowly with depth in the water column, and typically has values on the order of 0.1-0.2 for data from the recent experimental test results.

Combining Equations (48) and (49) gives:

$$\sigma_{log\,N}^2 = \ln[1 + \text{var}(I)/\langle I \rangle^2] = \ln[1 + \alpha_{Log\,N}]. \quad \text{Equation (50)}$$

Substituting Equation (50) into Equation (46) then gives:

$$\text{var}(K_{In-stride}) \approx \quad \text{Equation (51)}$$
$$\frac{\ln\{[1 + \alpha_{LogN}(z_1)][1 + \alpha_{LogN}(z_2)]\}}{4(z_2 - z_1)^2} \approx \frac{\ln\{1 + \alpha_{LogN}\}}{2(z_2 - z_1)^2},$$

where the last equality is for depths over which $\alpha_{Log\,N}$ varies little. Thus, for un-stratified water, halving the depth difference quadruples the variance (doubles the standard deviation) of two-shot in-stride K estimates. Thus, the method or algorithm may be employed with a depth separation as wide as is consistent with obtaining good signal levels for the image means $\langle I(z_1) \rangle$ and $\langle I(z_2) \rangle$.

For a single pair of shots, one exemplary method is as follows:
1. Create Smartcubes (co-registered and geolocated data sets) from the Co-Pol and Xr-Pol images at each depth;
2. Sum the Smartcube Co-Pol and Xr-Pol images to create one intensity image at each depth;
3. Compute the natural logarithm of each intensity image;
4. Compute the mean of the central portion of each log image, ignoring NaNs (i.e., no data cells), this yields the values of $\langle \ln(I(z_1)) \rangle$ and $\langle \ln(I(z_2)) \rangle$; and
5. Use Equation (45) to compute $K_{In-stride}$.

If time constraints do not permit smart cube creation, "dumb cubes" can also be used. Dumb cubes refer to non-georeferenced data set. This is possible so long as a wide-enough central portion common to both images exists:
1. Create Dark- and Flat-Corrected Co-Pol and Xr-Pol images at each depth;
2. Sum the Corrected Co-Pol and Xr-Pol images to create one intensity image at each depth;
3. Compute the natural logarithm of each intensity image;
4. Compute the mean of the central portion of each log image, ignoring NaNs; this yields the values of $\langle \ln(I(z_1)) \rangle$ and $\langle \ln(I(z_2)) \rangle$; and
5. Use Equation (45) to compute $K_{In-stride}$.

These procedures will yield a K estimate, but with important limitations: (a) the noise is given by Equation (51), and can be a significant fraction of the true K value if the depth difference $|z_2 - z_1|$ is small; and (b) the water clarity can vary over time, requiring frequent updates. The updates may spuriously jump around in value due to the noise in Equation (51). Both of these limitations can be mitigated with a multi-shot leaky-memory method, detailed herein.

Running Average Method

Keeping the $K_{In\_Stride}$ estimates of the most recent N shots in memory enables an algorithm to compute a running average, as follows:
(1) For the most recent throw-away shot pair at the desired depths, Compute $K_{In\_Stride}$ (New);
(2) Update the running average $$K_{Running\_Avg}(\text{Next}) = \quad \text{Equation (52)}$$
$$K_{Running\_Avg}(\text{Previous}) + \frac{1}{N}[K_{In\_Stride}(\text{New}) - K_{In\_Stride}(1)]$$

(3) Then update the N shots in memory:
for j=1:N−1

$$K_{In\_Stride}(j) = K_{In\_Stride}(J+1) \quad \text{Equation (53)}$$

end $$K_{In\_Stride}(N) = K_{In\_Stride}(\text{New})$$

(4) Repeat Steps 1-3 for each throw-away shot pair at the desired depths.

Computing $K_{In\_Stride}$ for each new shot pair is a relatively noisy process. This process may be improved by computing the average mean signals at Nom1 and Nom2. Nom1 is the first nominal depth that the system desires to hit for collecting data near the first nominal depth. Nom2 is the second nominal depth that the system desires to hit for collecting data near the first nominal depth Additional processing efficiency is improved through processes that are possible by assuming that the logarithm of the average over image-center pixels closely approximates the average of the logarithms of image-center pixels. This is possible because there is a finite scan angle and the intensity of the image will vary across the image at different depths. The systems uses logarithms to linearize the equation to establish a linear fit for K, however the logarithm of a sum isn't the same of a sum of logarithm. Thus, taking the average of the pixel values and computing their log or taking the logarithm of the pixels and then averaging them. This will generally be true for LIDAR gates in the water column, but wouldn't be true when the surface of the medium is straddle and some the values see returns in air and some see returns in water.

Leaky-Memory Method

Keeping N shots in memory is unnecessary if, instead of specifying a number N of shots to average, an exemplary method uses an exponential-decay rate $\varepsilon(\approx 1/N)$ for old information. The method or algorithm is simpler, requiring no detailed history of past values:

1. For the most recent throw-away shot, compute the actual gate-start depth Z, and μ(New)=the dark- and flat-corrected mean of the central portion of the total intensity (XrPol+CoPol). Be sure to exclude NaNs.
2. Update the leaky-memory averages of the mean signal levels at the depths of interest $\mu_1$(Next)=((1−ε)$\mu_1$(Previous)+εμ(New), if
|Z−Nom1|<tol.            Equation (54)

$\mu_2$(Next)=(1−ε)$\mu_2$(Previous)+εμ(New), if
|Z−Nom2|<tol            Equation (55)

3. Compute $K_{In\_Stride}$ (New) using a modified version of Equation (45):

$$\langle K_{In-Stride} \rangle \approx \frac{1}{2(Z_2 - Z_1)} \ln(\mu_1/\mu_2). \quad \text{Equation (56)}$$

4. Repeat Steps 1-3 for each throw-away shot.

The value of ε is selected according to how rapidly the water-K-factor is expected to change over the course of a data collection. Lower values of ε will give estimates with less noise, but more time lag as K changes.

Leaky-Memory Average Method

In order to reduce the noise of single-image-pair K estimation, the system can collect multiple image pairs, compute K for each pair, then average the resulting K values together. Because the water clarity can change, only the most recent number N of shots should be used.

Additional Considerations

Figure 4:
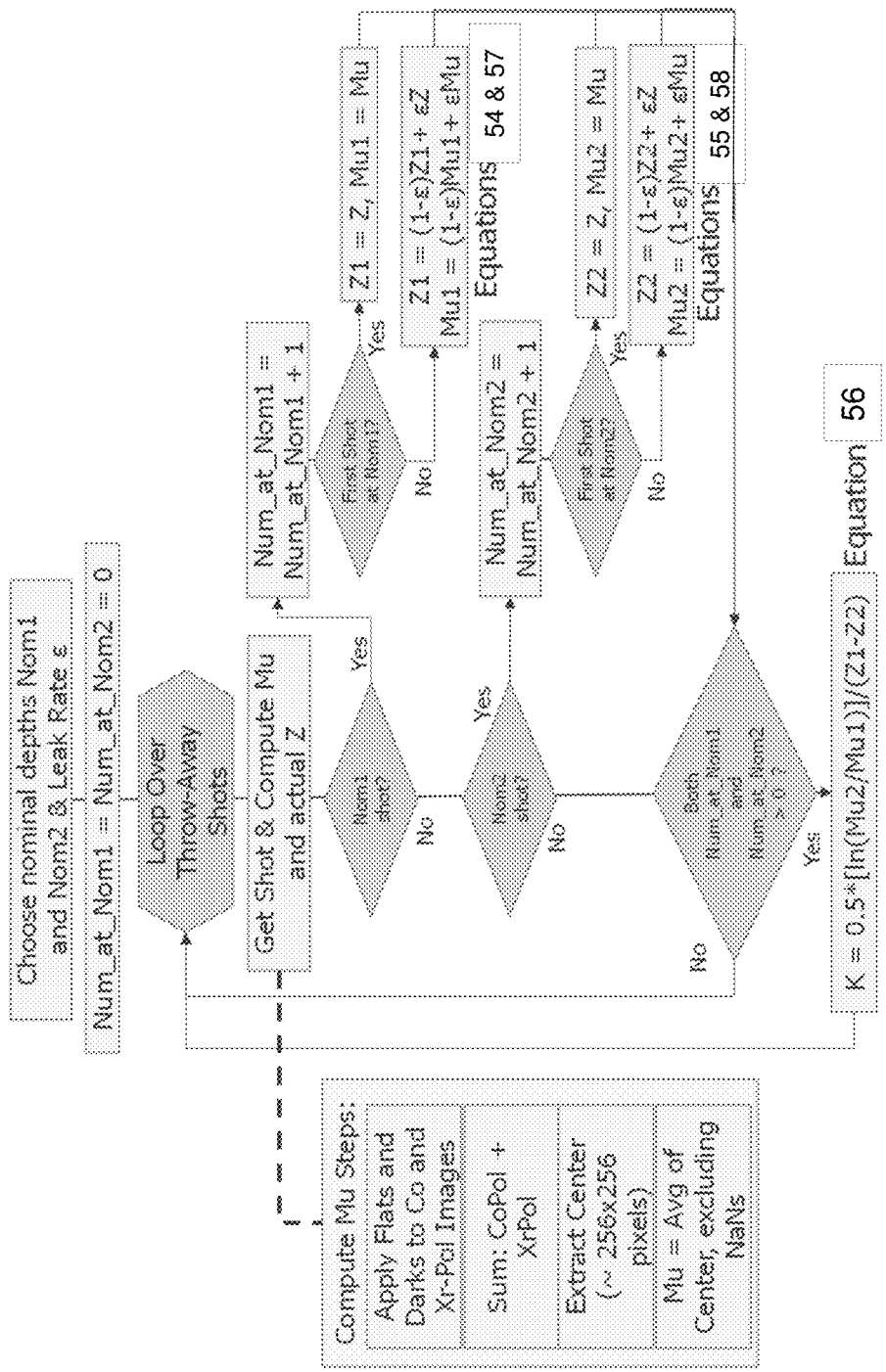
FIG. 4 is a flow chart depicting a method or process for a Leaky-memory in-stride K-Factor parameter of optical property characterization of a medium.

The process flowcharted in FIG. 4 includes several features designed to mitigate two potential glitches in the data. FIG. 4 is a flow chart that depicts the Leaky-memory in-stride K-factor process. In each throw-away shot, the CoPol and XrPol gate delays and widths are equal.

Figure 5:
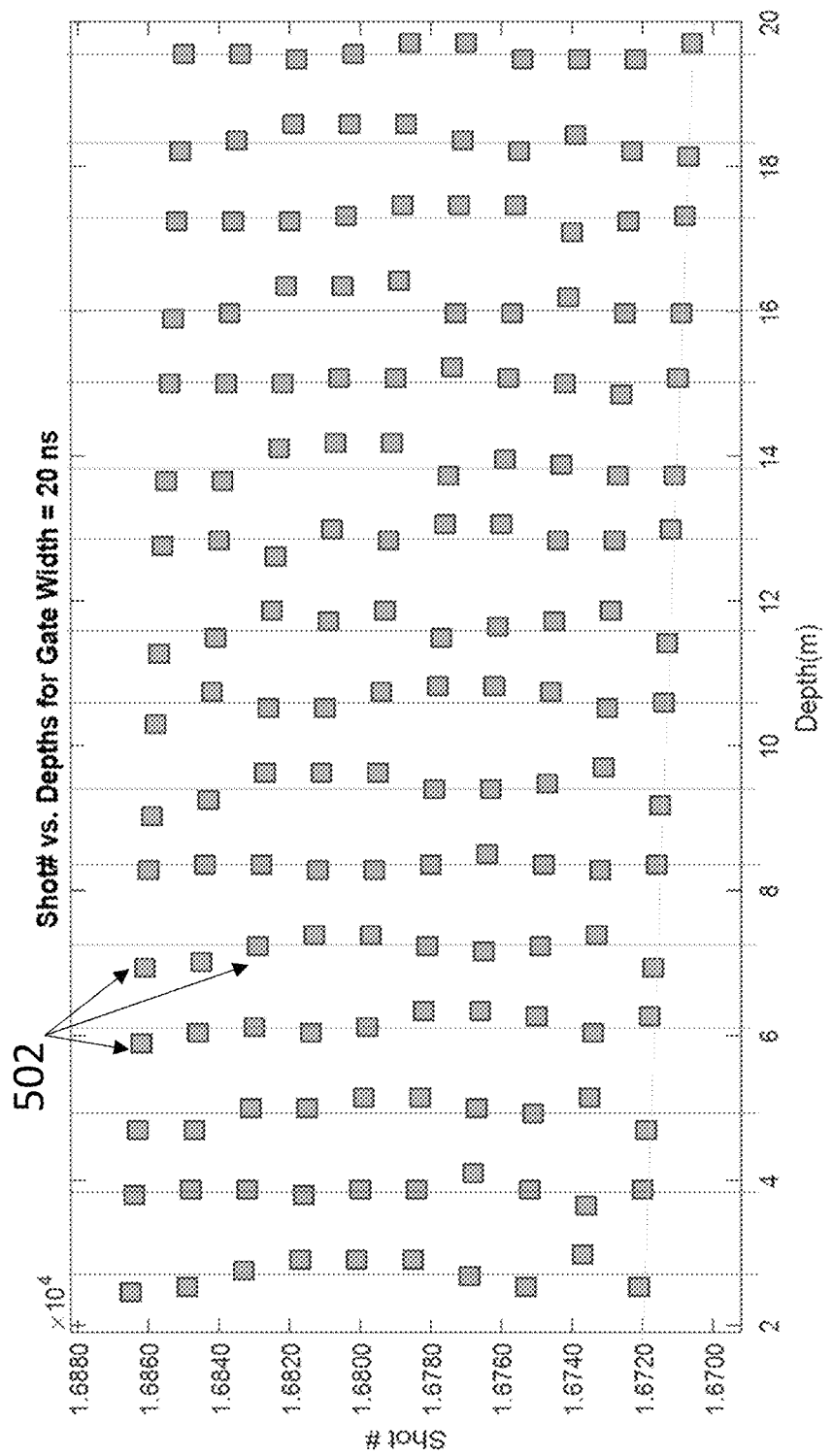
FIG. 5 is a graph depicting exemplary test results of LIDAR shots versus depth for a 20-ns gate, wherein the vertical lines represent nominal depths the squares represent actual depths.

With respect to the first potential glitch, while the shot timings in the system of the present disclosure are very accurate, there is known variability between the commanded nominal gate-starts and the actual gate-starts realized and recorded. Due to the variability, the actual gate start depths vary around the commanded depths, as shown in FIG. 5 For the exemplary test data, the variability was on the order of 0.4 meters, peak to peak.

The system or method of the present disclosure mitigates the shot-depth variability is to compute the actual gate-start depth Z for each throw-away shot, compare it to the desired nominal K-cal depths Nom1 and Nom2, and assign the shot to either Nom1, Nom2, if it is within a specified tolerance, or ignores the shot if it outside the depth tolerances. Because the depth jitter may be significant, the depths used to compute the next K estimate are also updated with a leaky memory method, updating the actual mean depths Z1 and Z2:

$Z_1$(Next)=(1−ε)$Z_1$(Previous)+εZ(New), if
|Z−Nom1|<tol.            Equation (57)

$Z_2$(Next)=(1−ε)$Z_2$(Previous)+εZ(New), if
|Z−Nom2|<tol.            Equation (58)

With the algorithm, the K estimate is updated every time Z is near either Nom1 or Nom2. There is no need to wait for new shots at both depths.

With respect to the second potential glitch, in addition to noisy depth values, other sources of spurious variability (such as lens roll-off, and wave refraction) affect the relative intensity between the image center and the image edges. These effects can be mitigated by computing image averages using only a central portion of each image—for example, 256×256 pixels in a 1040×1040 raw image. This has the additional benefit of reducing the number of computations required per shot, and reducing the need to compute smart cubes, wherein smart cubes are one or more data set(s) in which the images have been precisely translated and rotated to remove any alignment mismatches between the plurality of polarized images.

Validation

The method was tested versus data from exemplary test data/results, which were known as CMSS DC6 tests. An example of a truth data set is shown in FIG. 2. The environmental-characterization (K-char) mode with 20-ns gates is assumed to provide an estimate of the optical properties for $K_{In\_Stride}$. The K-char mode is implemented by fitting a low-order polynomial of log(intensity) versus depth to the entire set of K-char data over span of depths from the surface down to about 2 meters above the ocean bottom. The validation results of FIG. 2 provided a K vs depth curve from which "true" Ks between any pair of depths were extracted. For the data between 3.9 and 6.2 meters (2.3 meter separation), the mean K is approximately 0.1134/m, and for data from 3.9 to 8.4 meters (4.5 meter separation), the mean K is approximately 0.1099/m.

The in-stride algorithm shown in FIG. 4 may be applied to the K-char mode data set's 20-ns gate subset. Results are shown in FIG. 5 for a 4.5-meter separation between shots, and in FIG. 6 for a 2.3-meter depth separation. FIG. 5 depicts ten shots, represented by boxes 502, at each nominal depth for each gate width Nominal Depths (m) ~2.8, 3.9, 5.0, 6.2, 7.3, 8.4, 9.5, 10.6, 11.8, 12.9, 13.9 m. The sea bottom is at ~15 m. Depth variability vs nominal ~0.43 meters.

Figure 6:
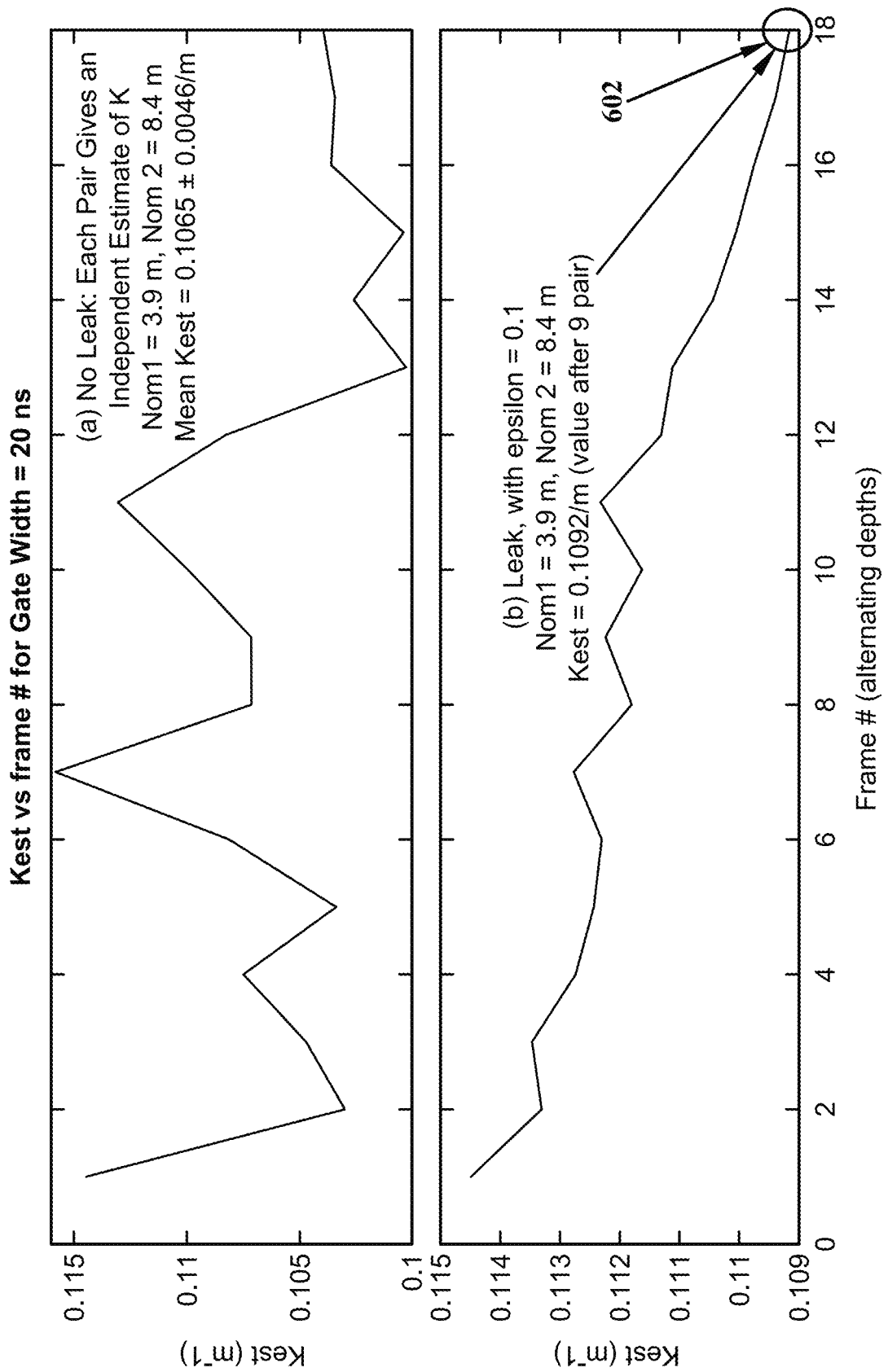
FIG. 6 is a graph comparing the estimate K-factor versus the frame number for a 4.5 meter separation between Nominal 1 and Nominal 2 for both (a) no Leaky memory and (b) with Leaky memory.

FIG. 6 depicts In-stride K for 4.5-meter separations between Nom1 and Nom2. Panel (a) of FIG. 6 depicts with no leaky memory, the K estimates vary from shot to shot with a mean of 0.1065/m and a standard deviation of 0.0046/m. Panel (b) of FIG. 6 depicts with a leak parameter ε=0.1 (approximately 10 shots), the K values settle after 18 shots (9 near Nom1 and 9 near Nom2) to 0.1092/m. The "true K" for this case of FIG. 6 is 0.1099/m as highlighted by circle 602.

Figure 7:
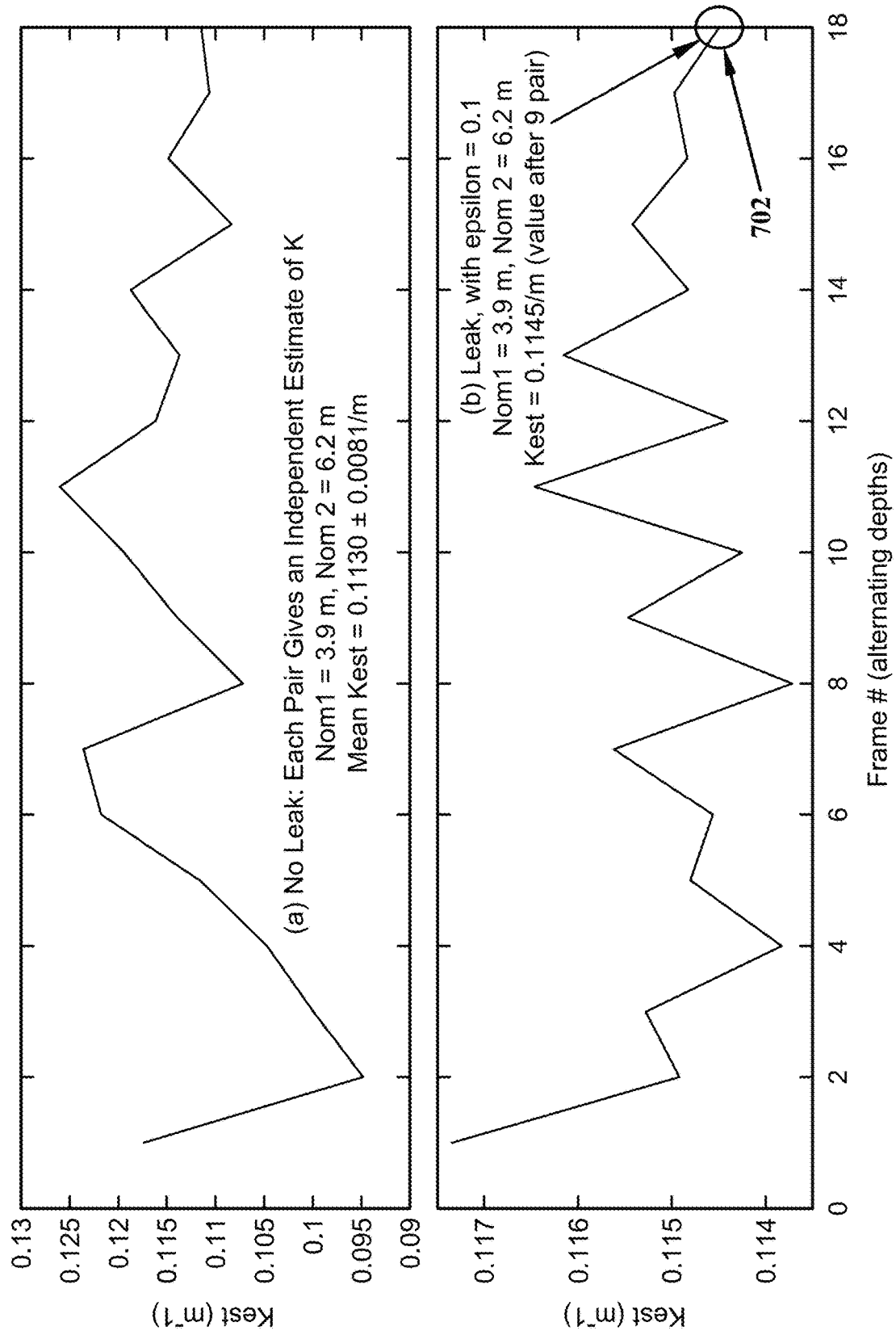
FIG. 7 is a graph comparing the estimate K-factor versus the frame number for a 2.3 meter separation between Nominal 1 and Nominal 2 for both (a) no Leaky memory and (b) with Leaky memory.

FIG. 7 depicts In-stride K for 2.3-meter separations between Nom1 and Nom2. (a) With no leaky memory, the K estimates vary from shot to shot with a mean of 0.1130/m and a standard deviation of 0.0081/m. (b) with a leak parameter ε=0.1 (approximately 10 shots), the K values settle after 18 shots (9 near Nom1, and 9 near Nom2) to 0.114/m. The "true K" for this case of FIG. 7 is 0.1134/m has highlighted by circle 702.

For each case, two graphs are plotted. Panels (a) of FIG. 6 and FIG. 7 show the variability with K-values for each pair of successive shots at Nom1 and Nom2 computed independently. In this case, the standard deviation is 0.0046/m for 4.5-meter separations, and 0.0081/m for 2.3-m separations, in rough agreement with Equation (56). The standard deviation may be reduced by half by doubling the depth separation. These standard deviations approximate 4% of the mean K-value for 4.5-m separation, and 7% of the mean K-value for 2.3-m separations.

Panels (b) of FIG. 6 and FIG. 7 show the variation of K estimates with a leak rate ε=0.1 (approximately 10 shots). By the end of 18 shots (9 at each nominal depth), the K-values asymptote to values within 2-3 percent of the K-char truth estimates. Longer runs of K-char data will be needed compute the actual standard deviations. Longer runs will also allow the use of smaller values of ε, which will improve performance, since errors vary approximately as 1/sqrt(ε).

Operations Count Estimate for Leaky-Memory In-Stride K Estimates

For each throw-away shot, number of operations to execute the algorithm shown in FIG. 3 is dominated by three kinds of calculations:
a) flat and dark corrections,
b) summing Co and Xr-Pol into an intensity image,
c) computing the mean of the pixels in the central ROI (region of interest).
(For speed sake, the creation of smartcubes isn't done, nor is it needed.)
For raw images measuring 1040×1040 pixels, and ROIs of 256×256 pixels, this is approximately:
Darks: 1040×1040=1.082 Million floating operations
Flats: 1040×1040=1.082 Million floating operations
Sum: 1040×1040=1.082 Million floating operations
Central Average: 256×256=0.066 Million floating operations
Total 3.32 Million floating operations per throw-away shot.
Operations count with 4 shots/second: 13.3 MegaFLOPS
Given four throw-away shots per second with a 30-Hz laser, the net processing load is on the order of 13.3 MegaFLOPS for the in-stride leaky-memory algorithm. A net processing load on this order allows for the continuous updating of medium K-values without requiring scan interruption for the K-char mode.

Figure 8:
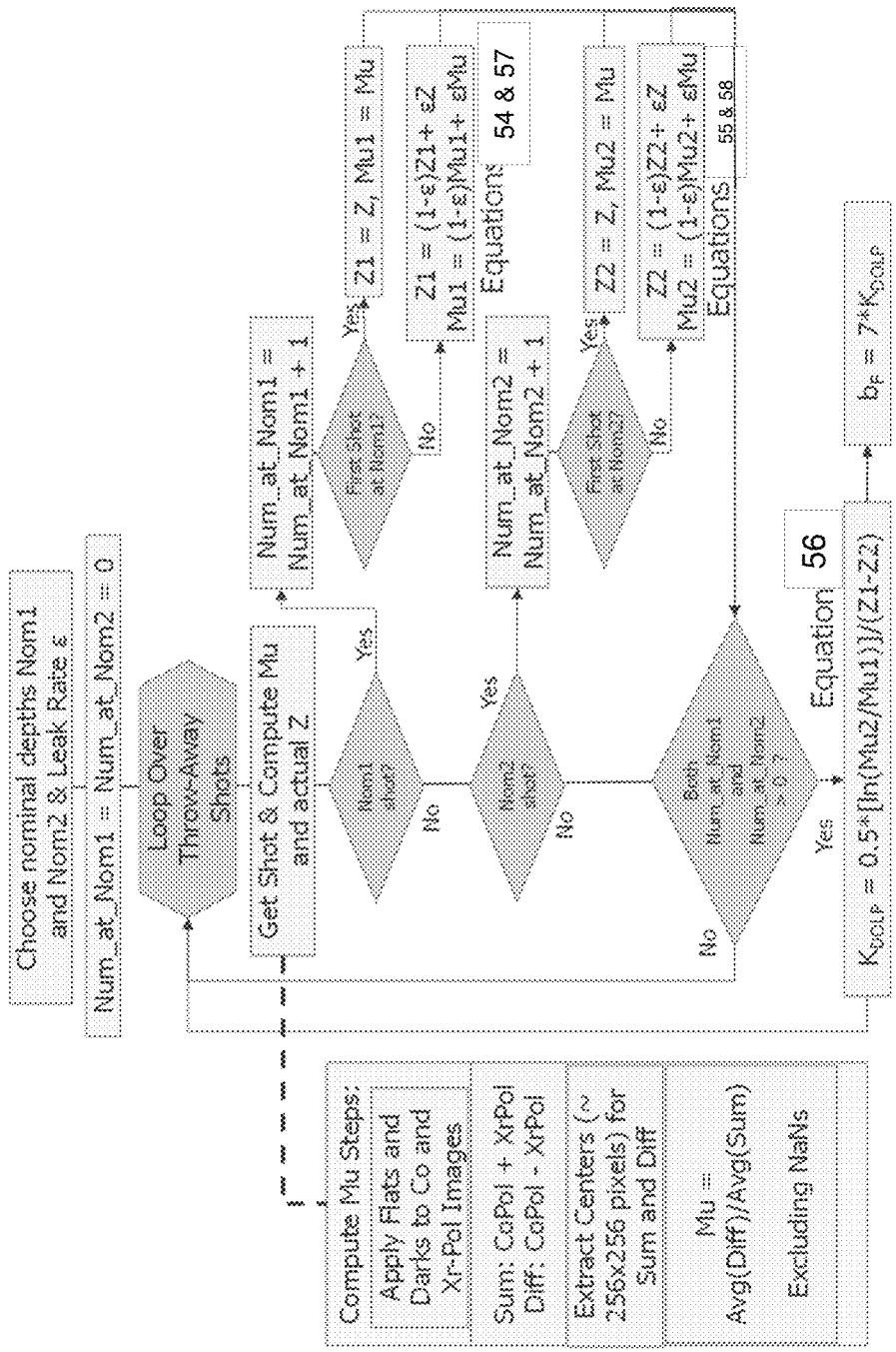
FIG. 8 is a flow chart depicting a method or process for a Leaky-memory in-stride computation of depolarization rate $K_{DOLP}$ and forward-scattering $b_F$.

Like the total laser intensity, the degree of linear polarization (DOLP) of an initially polarized laser beam also falls exponentially with depth in the ocean. This allows the in-stride K-char algorithm, with little modification, to be used to estimate the depolarization rate $K_{DOLP}$. The modified flowchart is shown in FIG. 8 and results from real-world data shown in FIG. 9. To estimate the forward scattering parameter $b_F$ from the depolarization rate $K_{DOLP}$, use the empirical relationship:

$$b_F = K_{DOLP} / d_{pol},  \quad \text{Equation (59)}$$

where $d_{pol}$ is typically ½. While the value of $d_{pol}$ has not been validated in all water types, $K_{DOLP}$ itself allows estimation of the depths at which polarimetric LiDAR will be effective in the specific water volume being investigated.

FIG. 8 depicts Leaky-memory in-stride computation of depolarization rate $K_{DOLP}$ and forward-scattering $b_F$. The primary difference between this and FIG. 4 is that the input Mu value is the mean DOLP ($Mu_{DOLP}$) instead of the total intensity of each K-char LiDAR shot.

Figure 9:
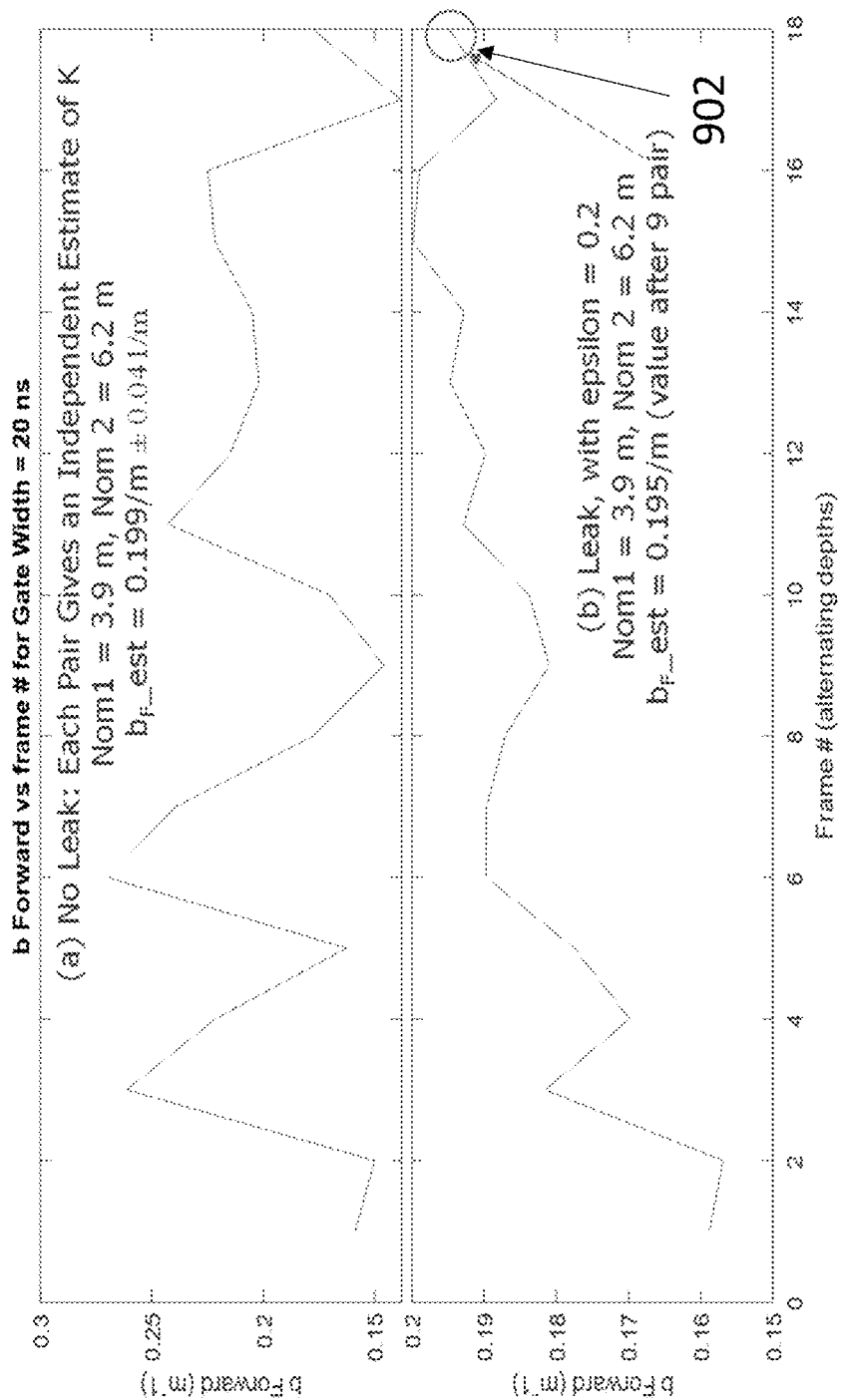
FIG. 9 is a graph comparing the forward-scattering $b_F$ versus the frame number for a 2.3 meter separation between Nominal 1 and Nominal 2 for both (a) no Leaky memory and (b) with Leaky memory.

FIG. 9 depicts In-stride forward-scattering $b_F$ computed from DOLP for 2.3-meter separations between Nom1 and Nom2. (a) With no leaky memory, the K estimates vary from shot to shot with a mean of 0.199/m and a standard deviation of 0.041/m. (b) with a leak parameter ε=0.2 (approximately 5 shots), the K values settle after 18 shots (9 near Nom1, and 9 near Nom2) to 0.195/m. The "true $b_F$" from the full environmental characterization for this case of FIG. 9 is 0.196/m as highlighted by circle 902.

If there are objects in the images such as foam patches, large fish or schools of fish, biologics like jellyfish or seaweed or floating debris or decoys, or even boats, then these are depicted as either reflectance or shadow. To account for these objects, the present disclosure provides a wide region of interest that is averaged to make sure outlier pixels contribute in a small way. In addition, with enough shots, a few frames with many outliers will eventually be diluted out of the running average, if the running-mean parameter epsilon is small. The depth filter will, of course, help reject boats, flotsam, the sea bottom, and glints. If there are enough FLOPS to spare, the outlier pixels could be filtered before the averaging to further reduce the noise.

With respect to variability in gate start, the gate start may include variability from all sources like waves and is that for nadir or at angles off nadir. The dominant source of gate variability within the system is due to a laser quality switch or Q-Switch to light out variability, which can be selectively chosen to mitigate. In one embodiment waves are not accounted for in the variability, but are mitigated by using a wide ROI for the pixel averaging. The Q-switch variability is typically included in the times computed from the metadata.

In some scenarios, K-Char mode is straight or directly downward (Nadir) looking. However, the throw away shots will vary but may not be at Nadir for example if the platform 12 is pitched during flight. The algorithm may account if the light path isn't at Nadir by accounting for the off-Nadir angles that are provided by metadata in the images. If the off-Nadir angles are small (for example under 15 degrees), then no correction may be necessary. If the off-Nadir angles are large (for example, larger than 15 degrees), the method can correct the path difference to be the slant path in water, but this will add a cosine factor that will be factored or filtered by the calculations to account of the off-Nadir angles. Notably, the region of interest for the central average exclude portions of the gate that are above the surface or below the bottom.

Additionally, there is a way to reduce settling time for the Leaky Memory approach. Settling time is the amount of time it takes the system to find the average of multiple shots to smooth to a level that the estimate K can be used. For example, average the first several estimates and fill the memory with this value, then turn on leaky memory. Alternatively, Settling time can be reduced with an initialization technique that eliminates the noise in the first one to ten scans. For example, If a full K-char mode has been run, it can be used to initialize the K-values. Another alternative is to use a larger value of epsilon (closer to 1) for the first few shots, then reduce it to a value of epsilon that is significantly less than 1 (i.e., less than 0.5) or the remainder of the shots.

The present disclosure additionally teaches obtaining depth in a medium from in-stride measurements from "throw-away" shots or any other four laser shots. Having thus described the system and process for characterizing the medium through LIDAR polarimetry, reference will be made as to how depth or altitude can be measured by exploiting the medium's characterization as discussed above.

Obtaining Depth

Figure 10:
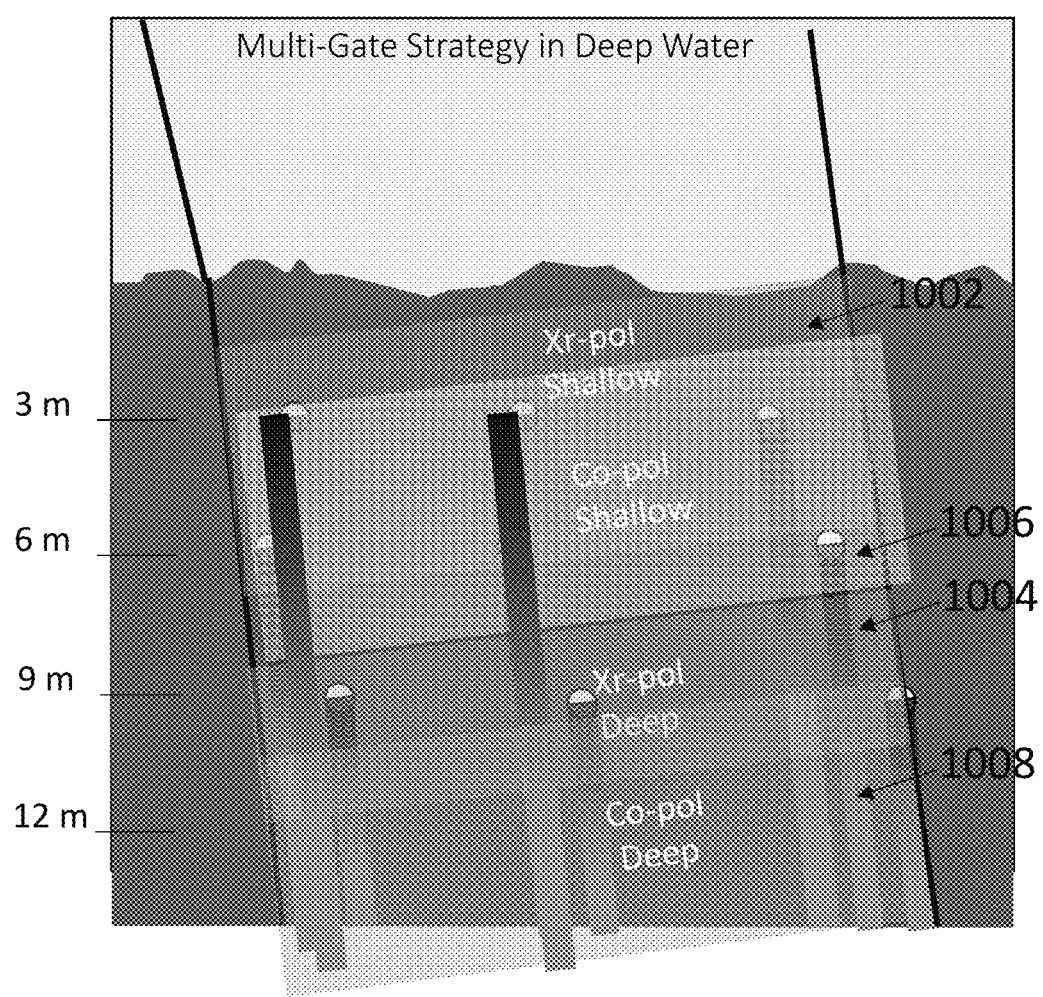
FIG. 10 is a diagrammatic operational view of a multi-gate approach for characterizing optical properties of a medium having two shallow gates including one copolarized shallow gate and one cross-polarized shallow gate, and having two deep gates including one copolarized deep gate and one cross-polarized deep gate.

FIG. 10 is an operational diagrammatic view of the medium and gates based on the configuration of system 10

(FIG. 1) of the present disclosure that provides multi-Gate Polarized LIDAR in a CMSS System. There is a Primary sensor that may be a high-pulse-energy polarized laser. The sensor includes one or more range-gated cameras, and is capable of collecting at least two near-simultaneous images. In one particular embodiment, there are at least two range gated cameras. However, if the camera gates and polarizations can be reset fast enough, then a single camera would suffice. In one example, there is a first camera (Camera 1) that is Cross-polarized (Xr-Pol) with a shallower gate 1002 and a deeper gate 1004 and a second camera (Camera 2) that is Co-polarized (Co-Pol), with a shallower gate 1006 and a deeper gate 1008. Surface glint interference is Co-Pol with the laser. The Xr-Pol and Co-Pol directions are relative to the polarization of the laser. As the laser propagates through seawater, polarization decreases slowly. Solid objects depolarize the beam, raising contrast versus Xr-Pol background. During each scan in search mode, there are four shots which are not used for target detection. The four shots are used for in-stride water-clarity and depolarization estimates with two shots per scan. Additionally, the four shots are used for in-stride depth estimates with two shots per scan.

Throughout the following discussions, the terms "water" and "bottom" refer to the exemplary case of imaging through a scattering medium consisting of water. It is to be understood that the method applies to any scattering medium or degraded visual environment (DVE) in which a surface of interest is embedded, such as "air" and "ground," "fog" and "vehicle," etc.

Figure 11:
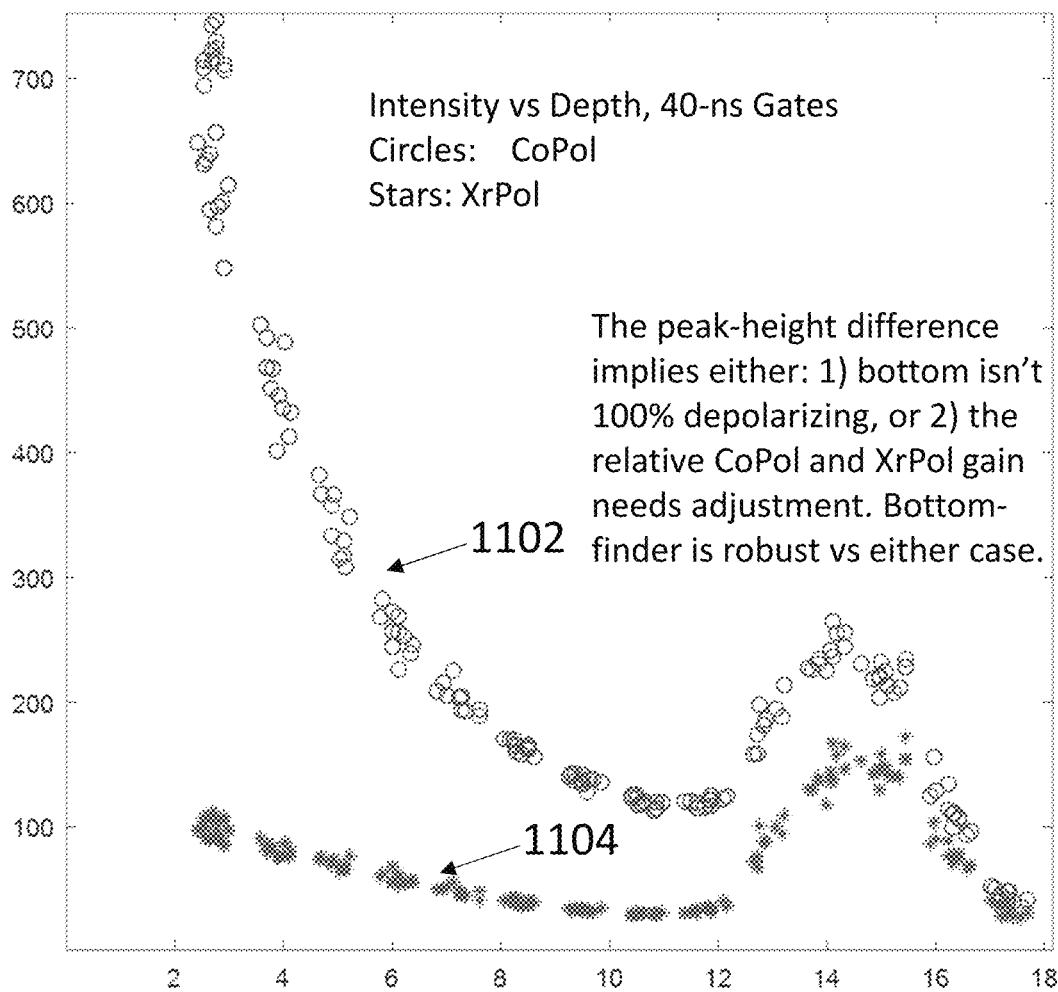
FIG. 11 is a graph depicting limitations associated with exemplary test results of a single gate approach.

FIG. 11 depicts the limitations of using brightness of a single gate from the exemplary test results/data (i.e., labeled in the Figures as CMSS DC6 data) with 40-ns gates. The CoPol results are represented by circles 1102 and the XrPol results are represented by stars 1104. Pulse width P is defined to be the distance between the half-maximum points of the rise and fall of the light pulse intensity with time. Likewise, the gate width W is defined to be the distance between the half-maximum points of the rise and fall of the gate response. The range of gate delays that will be bright due to a reflective bottom is approximately equal to the sum (P+W). XrPol is less perturbed by back-scatter, so it is easier to threshold. This example uses wide gates to minimize the rate at which bottom-finding gates have to be reset. However, for a 40-ns gate duration, and a 5-ns laser pulse, the net range of gate delays depicts the bottom covers about 5.6 meters, which is extremely coarse resolution.

The graph of FIG. 11 confirms that by using polarized light and gates set at two depths, a much better estimate of bottom depth can be made than with a single gate, and at high speed, with less data-collection burden than would be required by the prior art of stepping multiple narrow gates to precisely locate the ocean bottom.

In the following discussions, references will be made to the depths of receiver gates, and to multiple gates at different depths (Gate1, Gate2, etc.). The gate depth $z_{Gate}$ refers to the nominal depth of the shallowest portion—the "top" of the gate. The value of $z_{Gate}$ is the depth at which the gate response reaches one-half its maximum value. From pairs of CoPol and XrPol gated images, various DOLP (Degree of Linear Polarization) values can be constructed. In general, $$DOLP = \frac{CoPol - XrPol}{CoPol + XrPol} \qquad \text{Equation (60)}$$

In imaging applications, CoPol is the mean intensity (flat-, dark-, and gain-corrected) of a central portion of a co-polarized gated image, and XrPol is the intensity (flat-, dark-, and gain-corrected) of a central portion of a cross-polarized gated image. DEq is the DOLP when both gates are have equal depth and width W. The generalization to other polarization states, such as circular polarization, is herein referred to as DOP.

(i) D12 is the DOLP when Gate1 is Co-Polarized and Gate2 is Cross-Polarized.
(ii) D21 is the DOLP when Gate1 is Cross-Polarized and Gate2 is Co-Polarized. Further, when both CoPol and XrPol data are collected in multiple gates at different depths, multiple values of DEq can be computed, such as:
(iii) D11 is the DEq for Gate1, and
(iv) D22 is DEq for Gate 2.

If we designate the depth of the start of Gate1 relative to the bottom depth as G1, and the depth of the start of Gate2 relative to bottom as G2, then the plots of D11 vs. G1 and D22 vs. G2 will give identical results, as long as the gate width W and pulse width P are held constant. Thus, the system of the present disclosure can synthesize a curve DEq of polarization vs depth by combining the D11 and D22 data sets. This provides bottom-depth information across a wide depth range of approximately the sum (W+P).

The exemplary cases are for all gates having equal width W. The method also applies, with appropriate modifications, to cases in which the gates have different widths. For example, and with respect to modifications, it is possible to implement this method if the gate widths are different, but the modifications would need to account for the different widths of the gates. For example, if gate 1 is 20 ns and gate 2 is 50 ns, then the calculations would utilize the 20 ns that gate 1 and gate 2 overlap. In addition, the method is not limited to linear polarization: it applies equally well to other DOPs, such as DOCP (Degree of Circular Polarization), and other polarization measures that can be defined relative to a polarization state of the transmitted light.

Creating Lookup Tables for Ranging

With a polarized light source, the returned light polarizations are affected by the scattering properties of the media (air, smoke, fog, water, etc.) through which the light propagates, as well as by the polarization dependence of any reflective surfaces in the light path. The effect on the polarization make it possible to infer range to an object from the polarization properties of the returned signals because polarization varies strongly with distance as LIDAR gates approach and then overlap reflective surfaces. A system designer will choose LIDAR parameters (i.e., gate start, gate end, and the gain of each camera/image sensor), there will be a one-to-one relationship between polarization and distance to the reflective surface. Rapid in-stride computations of distances are facilitated by the creation of look-up table functions, or LUTs, that exploit this one-to-one correspondence. Ideally, a preliminary data collection over an area of interest would include both the scattering-medium and bottom-reflection components, so that a model of polarization versus distance can be populated and LUTs computed. In what follows, we also discuss how to estimate LUTs from incomplete information, such as not having a priori access to the surfaces of interest.

Empirical LUTs can be obtained by the following procedure:
  (i) Use the Kchar mode of the system to collect CoPol and XrPol data sets, then,
  (ii) Plot the various measures of DOLP versus gate-start depth;
  (iii) Identify the bottom in the data, and compute relative depths G1 and G2 of gate—starts versus the bottom depth;
  (iv) Identify monotonically-varying regions of the DOLP curves in the vicinity of the bottom depth, including the maximum and minimum DOLP for each monotonic region;
  (v) Fit curves, typically low-order polynomials, to the DOLP-versus-relative gate—start depth in each monotonic region. Alternatively, compile purely numerical LUT tables of DOLP vs relative depth, and specify interpolation algorithms; and
  (vi) Use the LUTs to infer bottom depth from the various measures of DOLP, when full Kchar data sets are not available.

Where empirical lookup tables are not available, a full range of bottom depths may not be available in the Kchar data sets. Therefore, models are used to extend the LUTs to unmeasured cases of interest.

Figure 12:
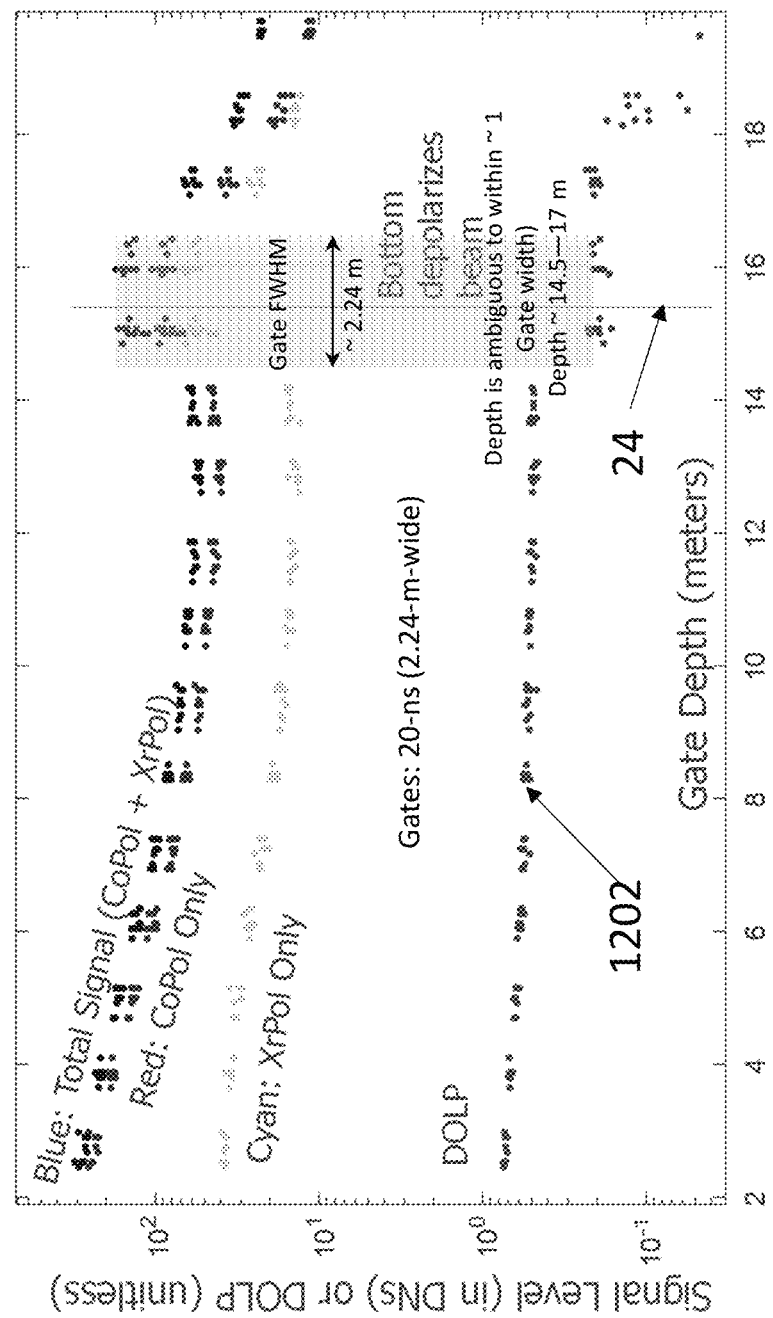
FIG. 12 is a graph depicting the effect of the sea bottom on polarized LIDAR return with the signal level or DOLP on the y-axis and the gate depth on the x-axis.

As depicted in FIG. 12, for DOLP-Aided Depth Estimates, the DOLP when the gates are equal (DEq) 1202 falls monotonically with depth near the sea bottom 24. As a polarized laser beam enters the water, it propagates. The DOLP decreases slowly with increasing propagation depth, until the sea bottom 24. The sea bottom typically completely depolarized the reflected light, resulting in a sharp drop in the DOLP 1202. With two gates, one co-polarized and one cross-polarized with respect to the transmitted beam, the system of the present disclosure can measure DOLP. With the two gates set to the same width and depth, setting a simple threshold on DOLP determines if the gate is above or below the bottom. Combined with intensity, this allows us to determine if the bottom is above, below, or in the gate. Depth resolution: ~gate thickness. This gives bottom depth 24 accurate to within one gate width.

Figure 13:
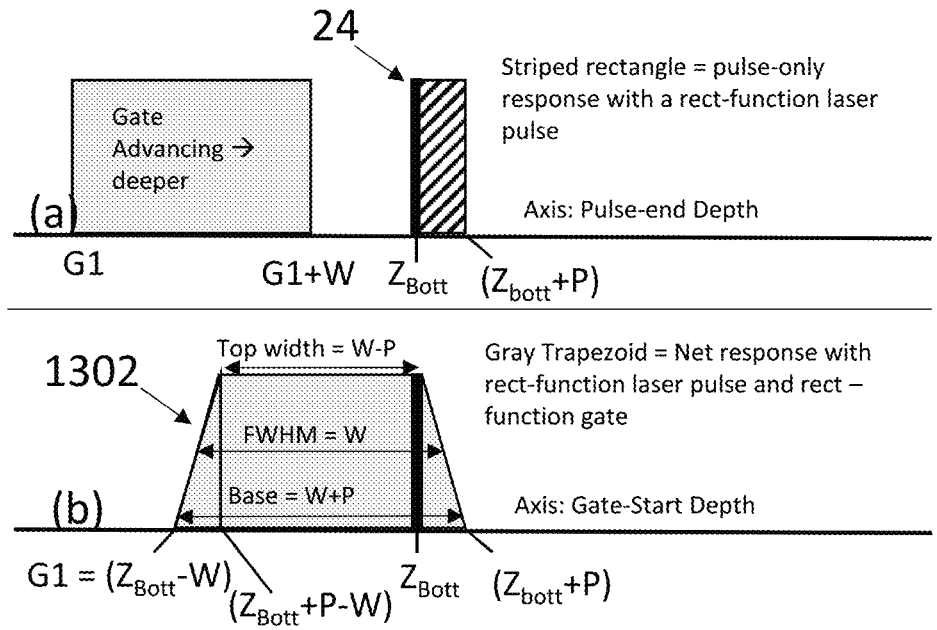
FIG. 13 is a diagrammatic representation of where the sea bottom should be located relative to the gate-start depths for intensity only.
Figure 14:
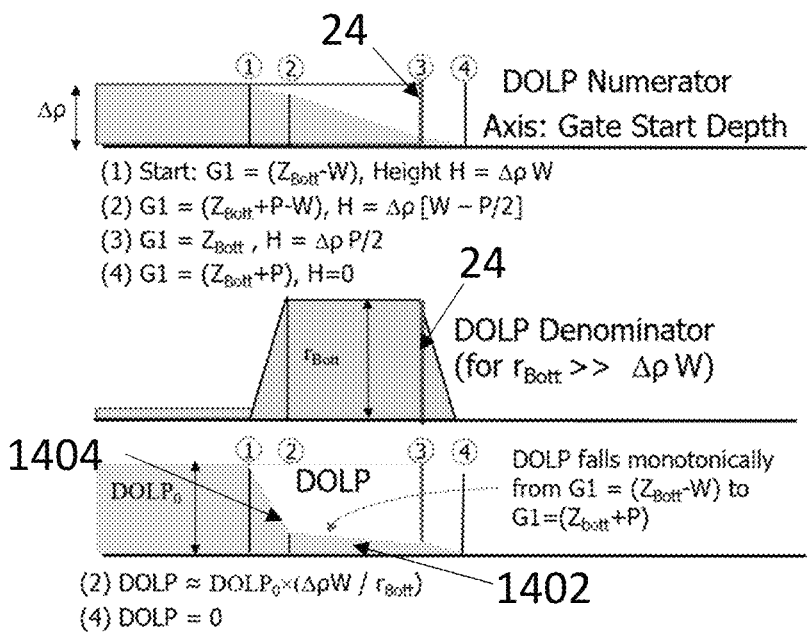
FIG. 14 is a diagrammatic representation of where the sea bottom should be located relative to the gate-start depths for polarization with gates starting at the same depth.

A model illustrating the phenomenology underlying FIG. 12 is shown in FIG. 13 and FIG. 14.

FIG. 13 depicts an example of how determining or predicting the depth to the bottom 24 relative to gate-start depths may be performed using radiation intensity only. FIG. 13 depicts this example in which, $Z_{bott}$=Bottom Depth (m); P=Laser Pulse Width (m); W=Gate Width (m); and G1=Gate 1 Start Depth (m). For an intensity-only image with a sea-bottom 24 much brighter than the water backscatter, the bottom is between W and (W+P) deeper than the gate start. For a 40-ns gate and a 5-ns laser pulse, this gives a span of ~5.6 meters. This results in a finding that intensity alone gives a coarse depth estimate, to within a resolution of ~(Gate Width+Pulse Width) as indicated by the trapezoid shape 1302. The near-bottom peak CoPol and XrPol intensity responses demonstrated empirically in FIG. 12 correspond well with the peak width shown in 1302. The fall-off in DOLP from its in-water value shown by the DOLP curve in FIG. 12 corresponds to the DOLP-vs-depth curve shown in FIG. 14.

FIG. 14 depicts an example of determining or predicting the depth to the bottom relative to gate-start depths that may be performed using polarization at the same depth. FIG. 14 depicts this example in which, Zbott=Bottom Depth (m); P=Laser Pulse Width (m); W=Gate Width (m); and G1=Gate 1 Start Depth (m). In this example and as shown in FIG. 14, starting when G1 is a gate-width above the bottom 24, DOLP falls sharply over ~1 pulse width, as shown at 1404, then slowly, to zero when G1 is a pulse-width below the bottom. Over the monotonic region 1402, depth relative to G1 can be inferred from DOLP. If the bottom 24 completely depolarizes laser light, then the signal difference is determined solely by the in-gate water backscatter. In this scenario, the signal sum is dominated by the bottom reflectance. Thus, DOLP steps down sharply, over about one laser-pulse width. The DOLP will step down from the in-water value $DOLP_0$ to a second lower DOLP value that is reduced by the ratio of the water DOLP to the bottom reflectance.

With two throw-away shots at different gate-start depths, yielding data for four gates: two co-polarized, and two cross-polarized, the present disclosure can obtain precision much better than one gate width, by exploiting multiple DOLPs. In the ideal case, the gate-start separation (G2-G1) is one-half the width of the gate width W, but any separation between zero and W can be used, though with reduced performance.

Figure 15:
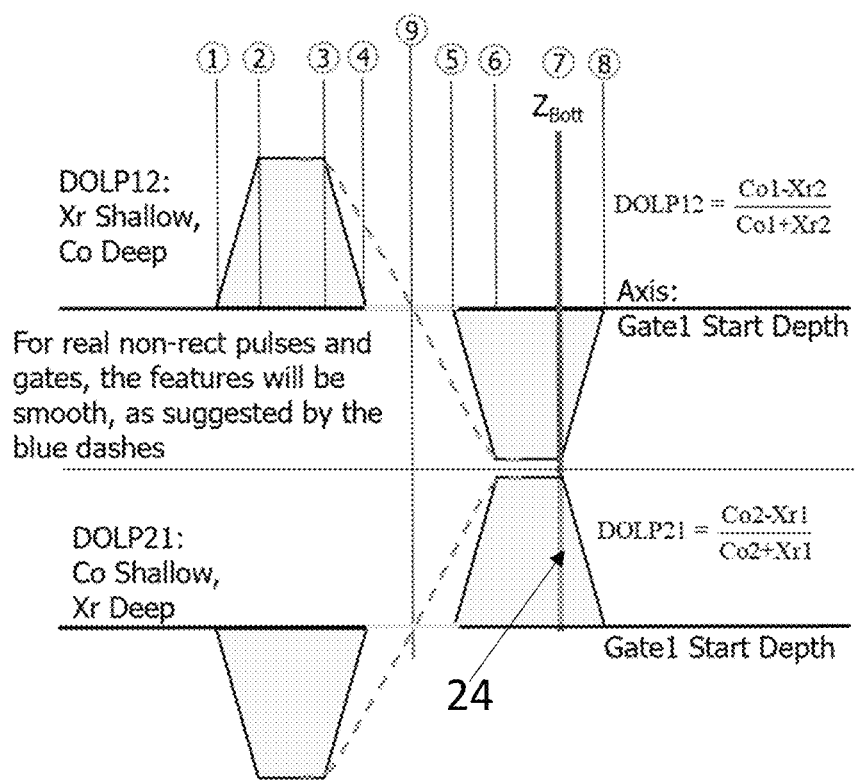
FIG. 15 is a diagrammatic representation of where the sea bottom should be located relative to the gate-start depths for polarization with gates starting at the offset or different depths.

FIG. 15 depicts a model example of how determining or predicting the depth to the bottom relative to gate-start depths may be performed using polarization at the offset depths. FIG. 15 depicts this example in which G1=Gate 1 Start Depth; G2=Gate 1 Start Depth, W=Gate width (equal for both gates); P=Pulse Width (rectangular function) Offset O=(G2−G1), W>(G2−G1)>P; and this assumes a completely De-Polarizing Bottom 24. In this example and as shown in FIG. 15, the central, steeply-varying portions of D12 and D21 cross at a precise location relative to the true bottom. This location is used to calibrate the LUTs that give precise-depth over a span of ~(O+P). In FIG. 15, there are nine lines that represent various features of the teaching example for an offset gate DOLP. At Line 1, the start of the pattern, G1=($Z_{Bott}$+O−2 W); at Line 2, G1=($Z_{Bott}$+P+O−2 W); at Line 3, G1=($Z_{Bott}$−W); at Line 4, G1=($Z_{Bott}$+P−W); at Line 5, G1=($Z_{Bott}$+O−W); at Line 6, G1=($Z_{Bott}$+O+P−W); at Line 7, G1=$Z_{Bott}$; at Line 8, G1=(ZBott+P); and at Line 9, the midpoint of the pattern, where D12 and D21 cross, will approximate: $G1_{Mid}$=$Z_{Bott}$−W+(P+O)/2 and for O=W/2, $G1_{Mid}$=$Z_{Bott}$−(¾)W+(½)P. The model shown in FIG. 15 elucidates the interpretation of the empirical results.

Figure 16:
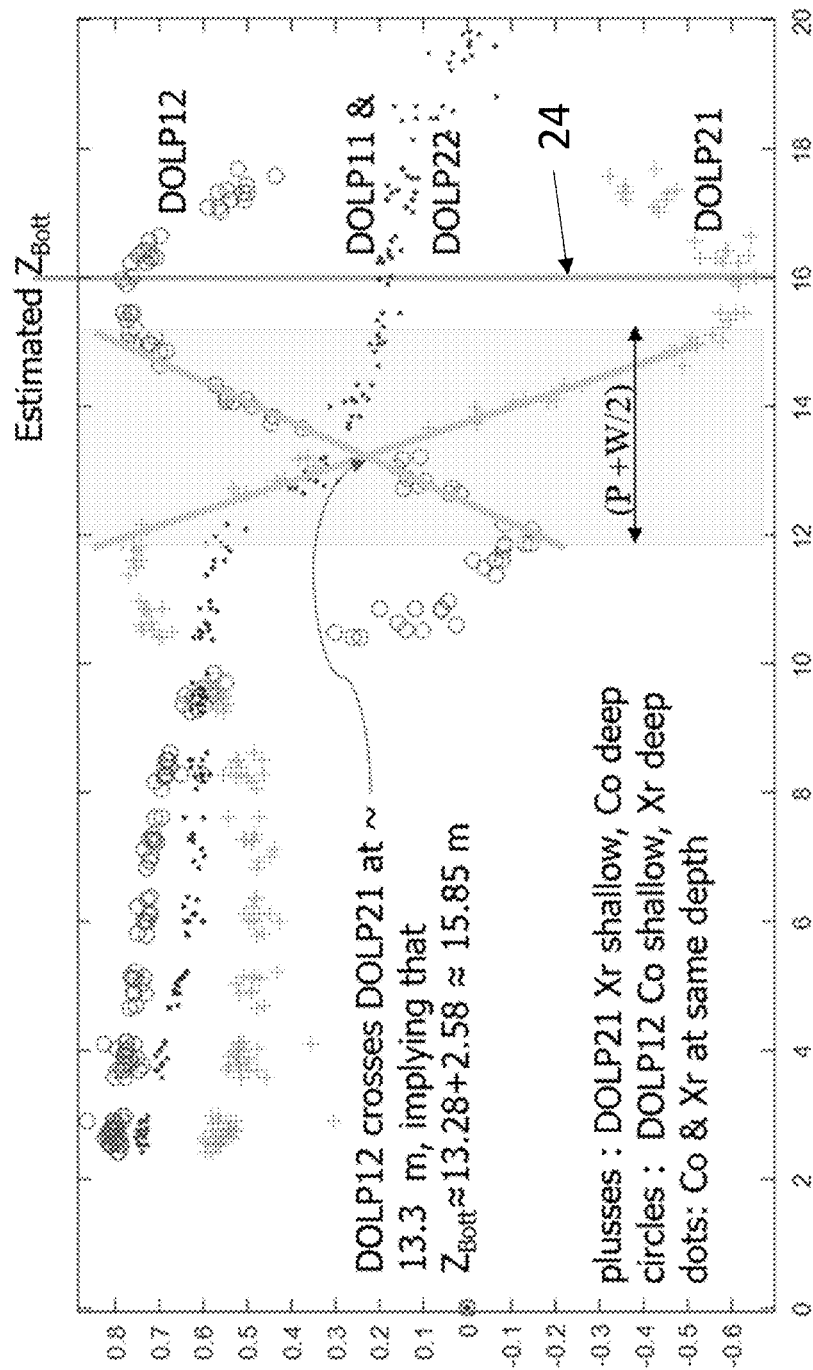
FIG. 16 is a graph depicting exemplary test data results in showing estimation of the sea bottom depth based on medium characterization data.

FIG. 16 depicts exemplary results of estimating the bottom depth from medium characterization, K-char, data. In the example of FIG. 16, DOLPs were computed from gate pairs offset by ½ Gate width. For 40-ns gates and a 5-ns laser pulse, W=4.48 m, O=W/2, P=1.56 m, so that: $G1_{Mid}$=$Z_{Bott}$−(¾)W+(½)P=$Z_{Bott}$−2.58 m. The graph of FIG. 16, the plusses (+) represent D21 XrPol shallow, CoPol deep; the circles represent D12 CoPol shallow, XrPol deep; and the dots represent CoPol and XrPol at same depth. The K-char data confirms near-linear regions with opposite slopes in the gate-overlap area. The opposite slopes cover approximately Overlap+Pulse Width. The system then builds LUTs with the four curves, namely, D11 (identified in FIG. 16 as DOLP11), D22 (identified in FIG. 16 as DOLP22), D12 (identified in FIG. 16 as DOLP12), and D21 (identified in FIG. 16 as DOLP21).

Figure 17A:
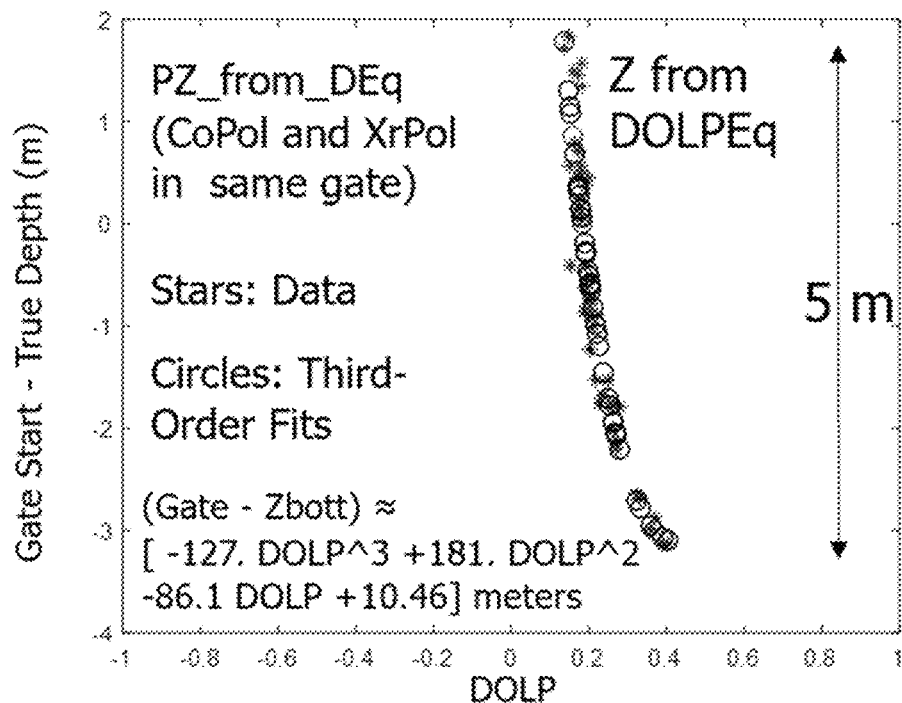
FIG. 17A is a graph depicting a resultant steep curve of the bottom depth utilizing look-up tables and using a single gate (DOLPEq) with gate starting depth on the X-axis and DOLP on the Y-axis that is indicative of approximate depth over a wide range.
Figure 17B:
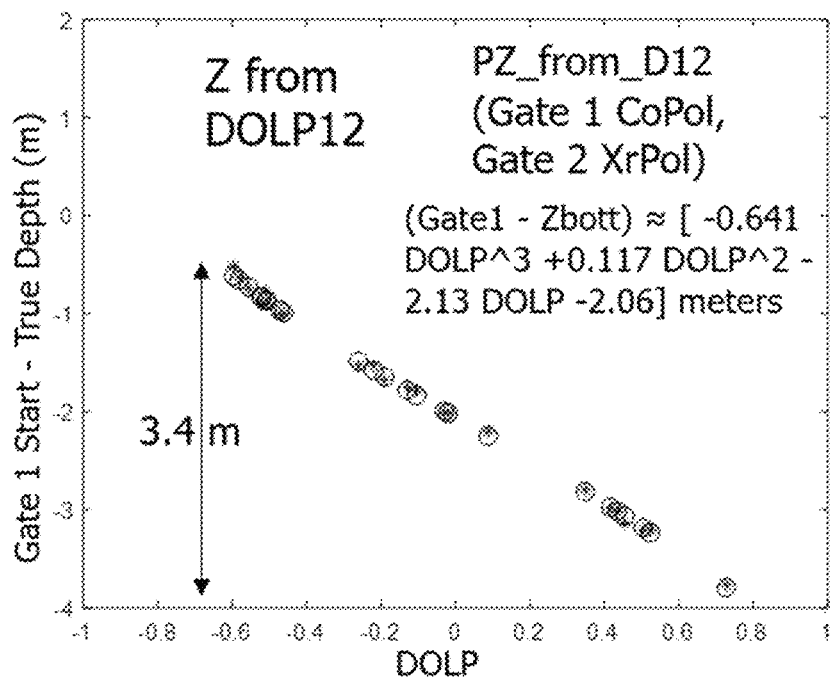
FIG. 17B is a graph depicting a resultant curve of the bottom depth utilizing look-up tables and using two different gates (Gate 1: CoPol and Gate 2:XrPol) with gate starting depth on the X-axis and DOLP on the Y-axis that is indicative of finer depth resolution over a narrower range.
Figure 17C:
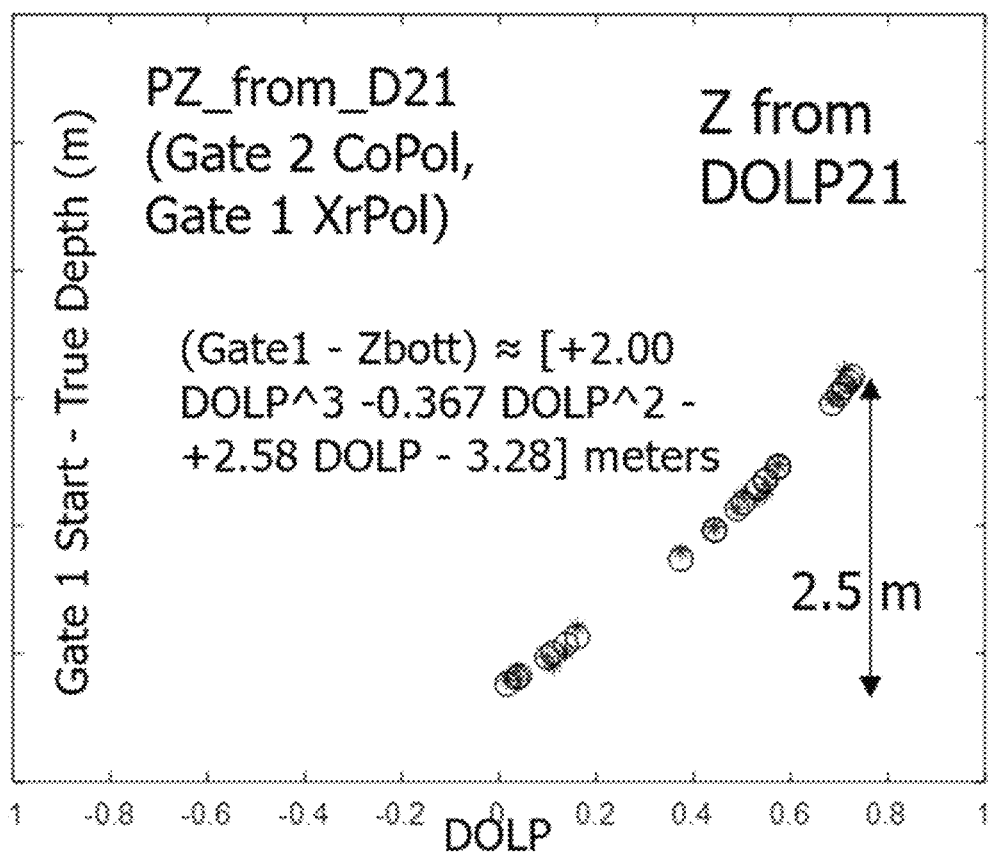
FIG. 17C is a graph depicting a resultant curve of the bottom depth utilizing look-up tables and using two different gates (Gate 1: XrPol and Gate 2:CoPol) with gate starting depth on the X-axis and DOLP on the Y-axis that is indicative of finer depth resolution over a narrower range.

FIG. 17A-FIG. 17C depicts the depth of sea bottom 24 ("Z") from DOLP LUTs as 3rd-Order Polynomials, wherein the empirical data are shown as stars and the third-order fits are shown as circles. In this case, the second gate G2 is 20 ns later than the first gate G1. The curves of bottom depth vs DOLP from a single gate (DEq) are steep and give approximate depth over a wide range. The curves of bottom depth vs D12 and D21 give finer depth resolution over narrower ranges. FIG. 17A depicts PZ_from_DEq with CoPol and XrPol in the same gate. FIG. 17B depicts Z from D21. FIG. 17C depicts PZ_from_DEq (polynomical obtained from fitting DEq data) with CoPol at the second gate and XrPol at the first gate.

Figure 18:
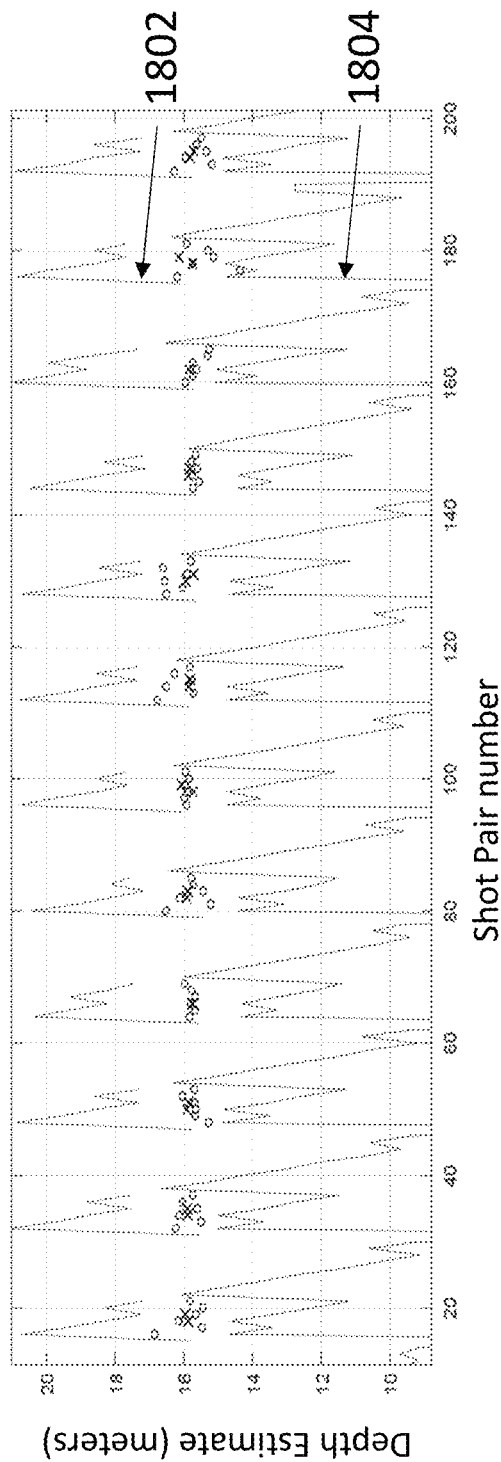
FIG. 18 is a graph depicting exemplary test data results of medium characterization data with depth estimates on the Y-axis and the LIDAR pulse shot pair number on the X-axis.

FIG. 18 is a graph depicting the depth from K-char mode is 15.86 m from 3rd-Order Polynomials fits. The results identified about 200 pairs of 40-ns-wide gates within ½ gate (about 2.2 meters) of each other. Gates moved through water column as K-char mode progressed. Most did not overlap the bottom. The algorithm reports a range for all pairs, though it may start at 0 or end at ∞. For the shot pairs for which at least one member of each pair overlapped the bottom, the depth estimate=15.81 m±0.41 m, for third-order fits. For the shot pairs for which both members overlapped bottom (as determined by brightness and DOLP thresholds), a more-precise measurement was possible: the Depth Estimate=15.86 m±0.11 m, for third-order fits. Upper Lines 1802 represent the Upper Depth Limit (missing points=infinity). The Lower lines 1804 represent lower depth limit (missing points=0); Circles represent the depth from just one gate DOLP and Xs represent depth from two gates, with bottom in gate-overlap region.

Figure 19A:
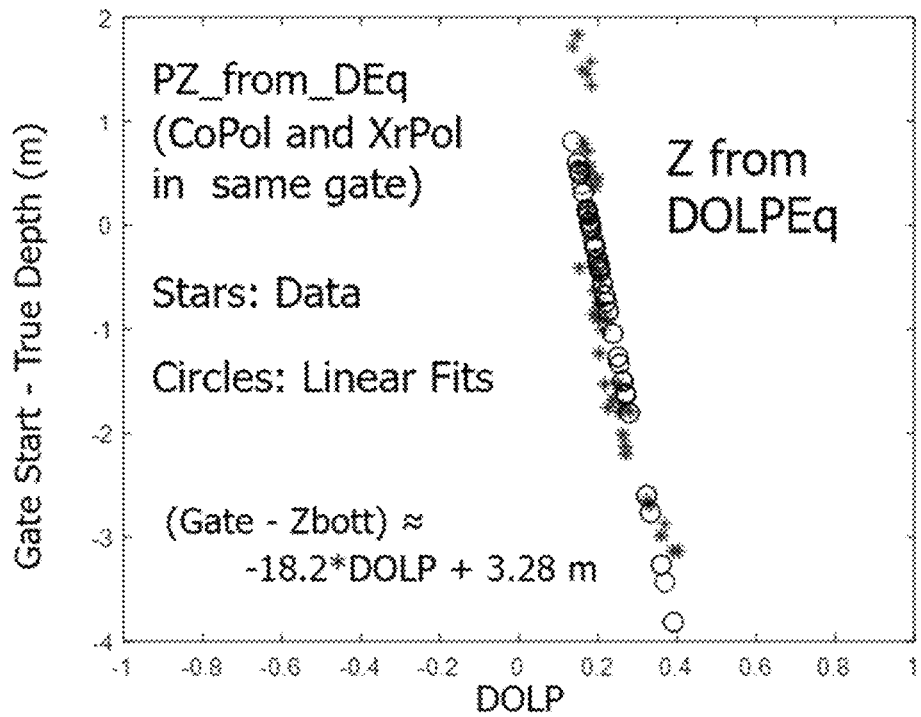
FIG. 19A is a graph depicting a resultant steep curve of the bottom depth utilizing linear fits and using a single gate (DOLPEq) with gate starting depth on the X-axis and DOLP on the Y-axis that is indicative of approximate depth over a wide range.
Figure 19B:
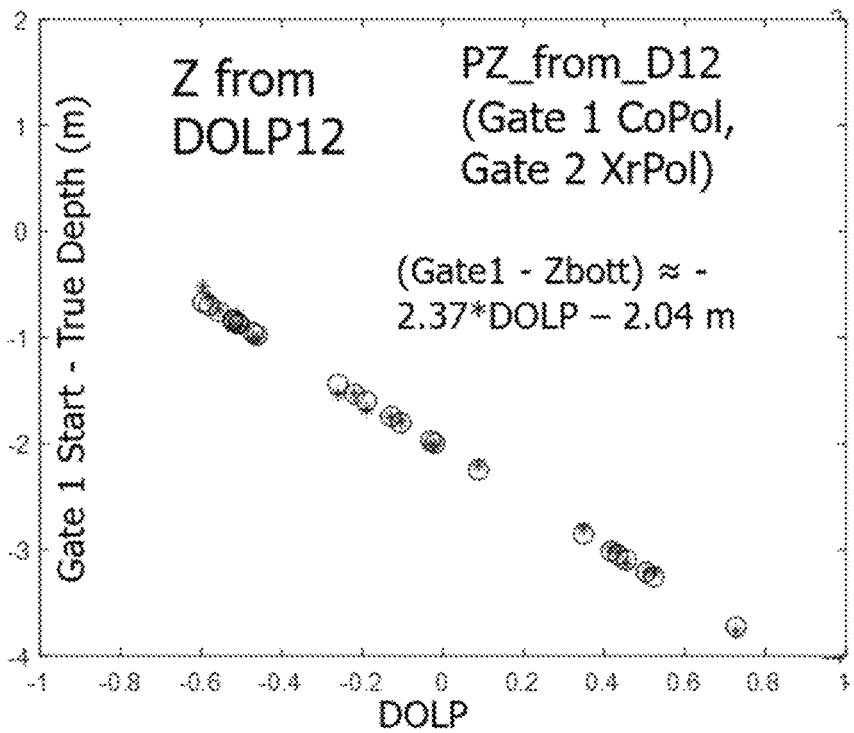
FIG. 19B is a graph depicting a resultant curve of the bottom depth utilizing linears and using two different gates (Gate 1: CoPol and Gate 2:XrPol) with gate starting depth on the X-axis and DOLP on the Y-axis that is indicative of finer depth resolution over a narrower range.
Figure 19C:
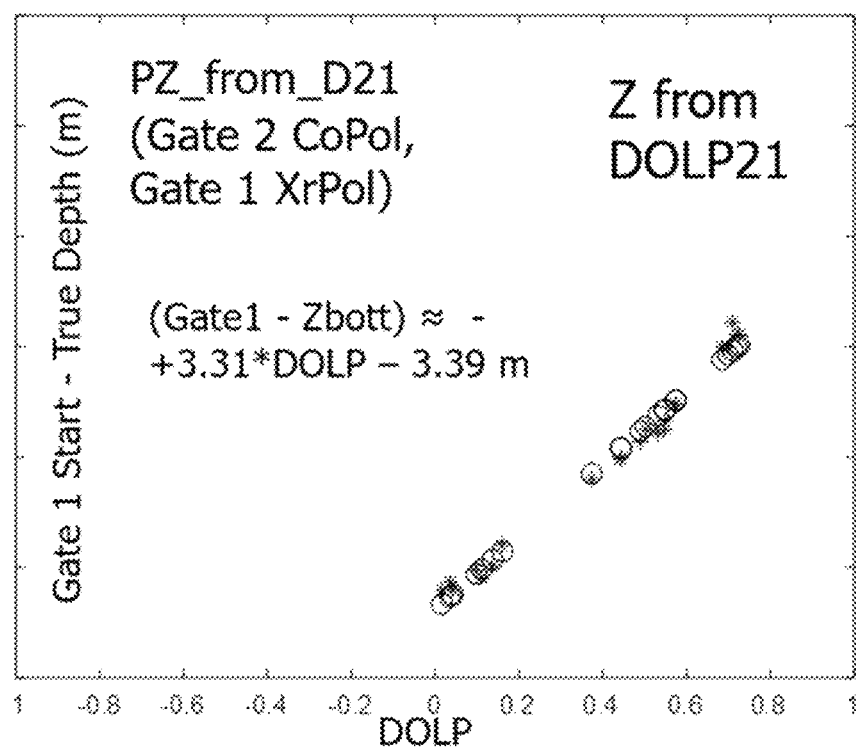
FIG. 19C is a graph depicting a resultant curve of the bottom depth utilizing linear fits and using two different gates (Gate 1: XrPol and Gate 2:CoPol) with gate starting depth on the X-axis and DOLP on the Y-axis that is indicative of finer depth resolution over a narrower range.

FIG. 19A-19C depicts the depth of seabottom, Z, from DOLP LUTs from FIG. 17A-17C but as linear (first-order polynomial) fits. The second gate G2 is 20 ns later than the first gate G1. The curves of bottom depth vs DOLP from a single gate (DOLPEq) are steep and give approximate depth over a wide range. The curves of bottom depth vs D12 and DOLP 21 give finer depth resolution over narrower ranges. FIG. 19A depicts PZ_from_DEq with CoPol and XrPol in the same gate. FIG. 19B depicts Z from D21. FIG. 19C depicts PZ_from_DEq with CoPol at the second gate and XrPol at the first gate.

Figure 20:
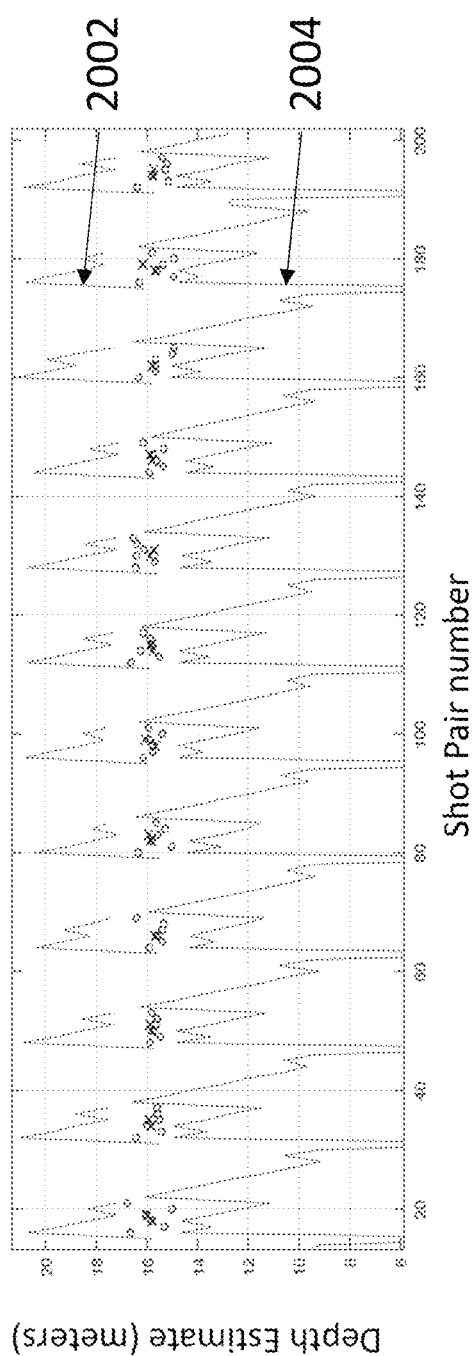
FIG. 20 is a graph depicting exemplary test data results of medium characterization data based on linear fits with depth estimates on the Y-axis and the LIDAR pulse shot pair number on the X-axis.

FIG. 20 depicts the depth from K-char mode is 15.86 m as linear fits. These results identified ~200 pairs of 40-ns-wide gates within ½ gate (~2.2 meters) of each other. Upper lines 2002 represent the upper depth limit (missing points=infinity). The lower lines 2004 represent lower depth limit (missing points=0); Circles represent the depth from just one gate DOLP and Xs represent depth from two gates, with bottom in gate-overlap region. Gates moved through water column as K-char mode progressed. Most did not overlap the bottom. The algorithm reports a range for all pairs, though it may start at 0 or end at ∞. For the shot pairs for which at least one member of each pair overlapped the bottom, the Depth Estimate=15.76 m±0.45 m, for linear fits. For the shot pairs for which both members overlapped bottom (as determined by brightness and DOLP thresholds), a more-precise measurement was possible, the Depth Estimate=15.84 m±0.13 m, for linear fits.

Figure 21:
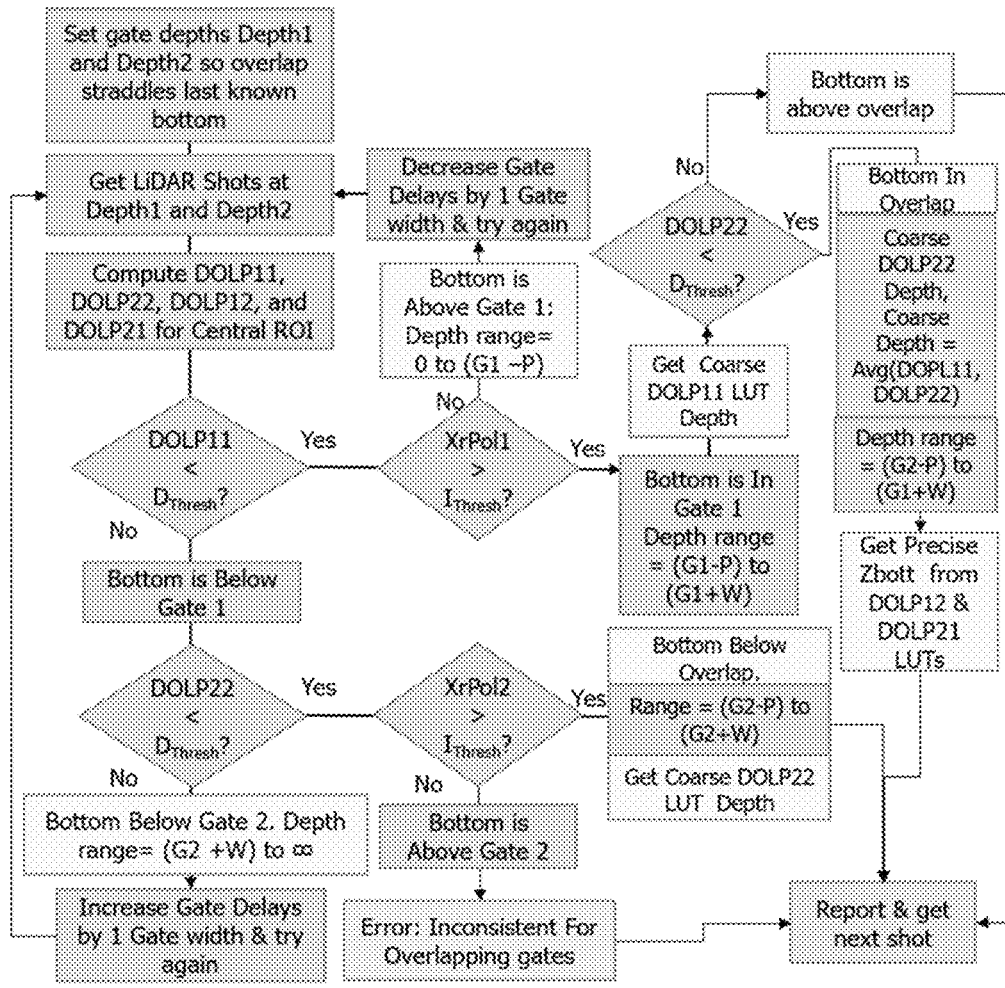
FIG. 21 is a flow chart depicting an exemplary method or process for using in-stride depth estimation to determine the bottom depth.

FIG. 21 is a flow chart that represents the process for using in-stride depth estimation to determine the bottom depth. The process computes Staggered-Gate DOLP-vs-depth look-up table for water type, gate depths and widths, and laser pulse shape. Then, sets thresholds for DOLPs and for Intensities (Intensities may be gate-depth-dependent). For each LIDAR shot, the method corrects for "flats and darks" by subtracting darks and dividing by flats. to correct the images, selects a central ROI to process; determines if the bottom is in shallow gates, deep gates, or overlap region; applies LUT polynomials computed from 3 DOLPs: DOLPEq, D12, D21; establishes a threshold on Intensity and DOLPEq and determine coarse depth range, wherein coarse depth range is in shallow gate, in deep gate, or in overlap region, then computes better depth from DOLPEq LUT, and if DOLPs are in overlap region, compute precise depth from D12 and D21 LUTs.

With continued reference to FIG. 21, for pre-processing: a gate width and relative separations (i.e. 40 ns width, 20 ns separation) are selected for bottom finding. Then, LUT functions for bottom depth $Z_{Bott}$ vs D12 and D21 are created. Then, DOLP thresholds DThresh for DOLP11 and DOLP22 are set. Then, the intensity thresholds IThresh for XrPol are set. In some instances, the coarse and precise depths that fall outside min/max range are discarded.

These results detail that precise target depth estimates can be obtained via Depth-from-DOLP processing. This is because gates are offset in depth, and thus the DOLP can be negative. Further, setting a negative-contrast threshold on deep gates allows extended region for depth estimates. The depth of moderately turbid water can be estimated with much higher precision than the gate width or laser pulse width. These results were achieved via two LiDAR shots that yield 4 gates (two XrPol and two CoPol) to exploit. When the gates overlap, but with different gate-start depths, this allows for precise depth determination over an extended range, via staggered-gate DOLP. In one example, the results shown that 0.13-m depth precision could be obtained using 4.48-m-thick gates and 1.12-m laser pulses. Additionally, these results show that LUTs with "K-char" data alone can be constructed as opposed to modified/simulated with K-char inputs.

For two gates at different start depths, with gate one having a shallower start depth G1 and gate 2 having a deeper start depth G2, 4 DOLPs are possible: (i) DOPL11: Co from Gate 1 and Xr from Gate 1; (ii) DOPL22: Co Gate 2 and Xr Gate 2; (iii) DOPL12: Co Gate 1 and Xr Gate 2; and (iv) DOPL21: Co Gate 2 and Xr Gate 1.

If DOLP11 versus G1 is plotted and DOLP22 vs G2 is plotted, they fall on the same DOLP-versus-Gate Start curve, so the system of the present disclosure can synthesize a curve DOLPEq by combining the data sets. This provides depth information across a wide range of approximately the sum (W+P).

If D12 versus G1 and D21 versus G1 are both plotted, they have opposite-sign slopes, and provide more-precise depth information, over a limited range.

Constructing the LUT

Having thus described the use of the LUTs, reference is now made to the creation of the LUTs. Initially, an operator collects polarimetric K-char data with the desired gate widths in an area that includes the sea-bottom at a depth within the range of interest. The system applies dark, flat, and gain correction. The operator will verify bottom is in the data set; determine Low-DN threshold Intensities; determine XrPol threshold Intensities for bottom-straddling vs water only; set shallowest allowable gate depth for bottom estimates; and set DOLPEq threshold for bottom vs water (for Equal-depth Co and Xr gates)

The next part of the process, the operator will select shots with the desired gate width and offset (normally 40 ns and 20 ns) for LUTs. The operator will identify gate pairs with desired overlap (normally ½ gate). Additionally, the operator will compute five DOLP-vs-Gate-Start Values for each shot pair, namely, DOLP11 (CO and Xr both shallow), DOPL22 (Co and Xr both deep), DOLPEq (combination of DOLP11 and DOLP22,Co and Xr at same depth), D12 (Co Shallow, Xr Deep), and D21 (Co Deep, Xr Shallow). The operator will select shot pairs with DOLPEq values within thresholds, AND at least one shot with XrPol intensity over threshold.

The next part of the process, the operator will find the Bottom in the K-char data set. This is accomplished by creating 5th-order polynomial fits to the DOLP-vs-depth curves. Then, from DOPLEq, D12, D21, compute coefficients Peq, P12, and P21. This may be accomplished by using a MatLab routine polyfit (X,Y,Order). The operator will find maximum and minimum DOLP ranges. The operator may use Peq, P12, P21 to generate smooth curves FitEq, Fit12, Fit21 versus depth over the range of depths of shots that were previously selected. Then, the operator or operation finds the central Monotonic region of Fit12 and Fit21, wherein Z12_MinVal, Z12_Max_Val=Depths of min and max of Fit12; Z21_MinVal, Z21_Max_Val=Depths of min and max of Fit21; Z21_Z12_MinVal=min(Z12_MinVal, Z12_Max_Val, Z21_MinVal, Z21_Max_Val); and Z21_Z12_MaxVal=max(Z12_MinVal, Z12_Max_Val, Z21_MinVal, Z21_Max_Val). The operator or operation creates a new set of 5th-order Polynomial coefficients P1221=P12-P21. The operation or operator find 5 roots (loci in meters) R1221=roots(P1221). The roots are tested. During testing of roots, the operation may discard significantly-complex roots (there will be at least one real root), discard roots outside central monotonic region (Z21_Z12_MinVal to Z21_Z12_MaxVal). If >1 root remains, then the Root= (median of the remaining roots). The Bottom Depth=Root+Gate Width−0.5*(Laser Pulse Width+Gate Offset).

For the next part of the process, the operation will re-perform the 5th order fits to obtain polynomials to determine DOLPs versus (Gate1-$Z_{Bott}$). One exemplary advantage of this is to avoid calculation of coordinate transformation of 5th-order polynomials. The operation creates 5th-order polynomial fits to the DOLP-vs-depth curves. This may be accomplished by computing X=(Gate Start-$Z_{Bott}$), and from DOPLEq, D12, D21, computing coefficients Peq_new, P12_new and P21_new.

The next part of the process finds maximum and minimum DOLP ranges for monotonic region in new coordinates, namely, D12_Min, D12_Max=D12 min and max values, with a tolerance added; Z_Min_12, Z_Max_12=Depths of min and max of Fit12new; D21_Min, D21_Max_21=D21 min and max values, with a tolerance added; Z_Min_21, Z_Max_21=Depths of min and max of Fit21new; D_Min_Eq, D_Max_Eq=DOLPEq min and max values, with a tolerance added; and Z_Min_Eq, Z_Max_Eq=Depths of min and max of FitEqnew.

The next part of the process computes Z-from-DOLP Polynomials from DOLPEQ, DOPL12, and D21. The operation can select the polynomial order (1 or 3). Then, reject data points with DOLPs outside of a Dnn_Min to Dnn_Max range (where Dnn is either D12, D21, or DEq). Then, reject data points more than 1.5 standard deviations away from 5th-order fits. Then, fit polynomials of (G1-Zbott) as a function of DOLP to the selected data, creating final fits utilizing PZ_from_Deq, PZ_from_D12, PZ_from_D21.

When Kchar data are incomplete, various models of polarized light propagation, scattering, and reflection can be used to compute theoretical LIDAR returns, and from those DOLPs and then LUTs. The application of the modeled LUTs for in-stride Kchar will be identical to that for the empirical LUTs.

As stated previously, the system is applicable to other mediums, such as air, when visibility is limited. For example and with reference back to FIG. 1, aerial platform 12, regardless of whether the platform is manned or unmanned, can utilize a polarimetric LIDAR (i.e., light beam generator 14) to obtain altitude of the platform relative to the ground (which is shown generally as the bottom 24) when the platform 12 is descending or attempting to land in a dusty, foggy, darkened, or other low visibility situation by analyzing the polarization returns 19 of the LIDAR. In this scenario, the system characterizes optical properties of the air (which is one exemplary type of "medium" or fluid 20) by determining a scattering rate and an attenuation rate of light through the air, wherein determining the scattering rate and attenuation rate of light through the medium is accomplished by utilizing polarized light transmitted from an optical source. The system can effectuate the performance of a function based on the characterized optical properties of the medium, wherein the object ranging through the medium. Wherein object ranging refers to finding the distance to the ground surface (i.e., the descending altitude of the platform relative to the ground surface, which is would be the object to which the distance is being determined).

Range to a Surface to Land the Platform

As applied to FIG. 1, in this exemplary embodiment that pertains to finding the altitude (i.e., one exemplary type of range determination) of aerial platform 12 for usage in low-visibility scenarios, the system comprises the moveable platform 12 carrying a laser imaging detection and ranging (LIDAR) system, a laser beam-projector assembly 14 that generates a polarized laser beam, and a polarization-sensitive sensor 16 that receives reflected signal radiation from a surface embedded in a medium. On the platform 12, there is ranging logic to determine a distance between the moveable platform and the surface by moving the moveable platform over the surface only a single time (as described herein utilizing the in-stride measurements) based on characterized optical properties of a medium (i.e., the low-visibility air) having been determined by a scattering of light through the medium, wherein determining a scattering of light through the medium is based on scattering rate and attenuation rate of the polarized laser beam through the medium as observed in the reflected signal radiation. As stated previously, the moveable platform 12 is an airborne platform and the surface is ground, and wherein the medium or fluid 20 is air containing haze, fog, dust, smoke, or humidity that impairs visibility or interrupt human-observable visibility, and the ranging logic is in communication with a platform guidance system, wherein the ranging logic assists platform guidance and altitude determination in low-to-no visibility scenarios. With respect to impairing visibility, it refers to that seeing through obscurants can be extremely difficult without specialized tech that goes beyond simple telescopes or image intensifiers.

Additional Characterization Features

As discussed herein, the system and method of the present disclosure enables the performance or otherwise performs a function based on the characterized optical properties of the medium, wherein the function is selected from a group comprising: object detection in the medium, ranging through the medium to the object or sea floor, or image deblurring of an object in the medium. However, there are instances where no such performance of the function is required or necessary. the techniques disclosed herein are beneficial for establishing non-contact characterization of the medium. For example, there are scenarios where a user may desire or need to determine how murky the water (i.e., when the medium is seawater or lake water) is and whether it's because of absorption or scattering. This would be helpful for fisheries assessment, pollution monitoring, and in-situ-optics performance predictions, among other things.

Sundries

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
transmitting polarized light from an optical source through a medium, wherein the medium is seawater, and wherein the polarized light scatters as it progresses through the medium and the polarized light is depolarized and reflected in response to contacting an object or sea floor;
receiving reflected depolarized light, subsequent to contact with the object or sea floor, in an optical receiver that is range gated over two or more time intervals;
characterizing optical properties of the medium by determining a scattering rate and an attenuation rate of light through a medium, wherein determining the scattering rate and attenuation rate of light through the medium is accomplished by utilizing polarized light transmitted from the optical source; and
performing a function based on the characterized optical properties of the medium, wherein the function is image deblurring of an object in the medium, wherein when the function is image deblurring of an object in the medium, deblurring the image is accomplished by executing a mathematical deblurring function that accounts for the total scattering rate obtained from using polarized light generated from the optical source.

2. The method of claim 1, wherein characterizing optical properties of the medium is accomplished by a Leaky-Memory Average Method comprising:
reducing noise of a single-image-pair characterization attenuation rate (K) estimation and depolarization rate ($K_{DOLP}$);
collecting multiple image pairs;
computing K and $K_{DOLP}$ for each image pair, then averaging resultant K values together and averaging resultant $K_{DOLP}$ values together; and
using the averaged resultant K and $K_{DOLP}$ values to perform the function.

3. The method of claim 1, wherein characterizing optical properties of the medium is accomplished by a Running Average Method comprising:
keeping in-stride image-pair characterizations of K and $K_{DOLP}$ ($K_{In\_Stride}$) of a most recent N-number of image shots in a memory;
computing, for an image shot pair at a desired depth, a new in-stride image-pair characterization attenuation rate ($K_{In\_Stride}$ (New)) and depolarization rate ($K_{DOLP}$ (New));

updating a running average; and using the running averages to perform the function.

4. The method of claim 3, wherein the image shot pair at a desired depth is a most recent image shot pair.

5. The method of claim 1, wherein characterizing optical properties of the medium is accomplished by a Leaky-Memory Method comprising:

utilizing an exponential-decay rate $\varepsilon$ of a most recent N-number of image shots;

computing, for an image shot pair, an actual gate-start depth Z;

computing a mean signal value ($\mu$(New)) that equals a dark-corrected and flat-corrected mean of a central portion of a total intensity (XrPol+CoPol) of the image shot pair;

updating leaky-memory averages of the mean signal levels at one or more depths of interest;

computing a new in-stride image-pair attenuation and depolarization characterizations ($K_{In\_Stride}$ (New));

using the leaky-memory averages to deblur the image.

6. The method of claim 5, further comprising:

computing the dark-corrected and flat-corrected mean subtracting XrPol from CoPol minus XrPol to yield a product and dividing the product by the total intensity (XrPol+CoPol) of the image shot pair.

7. The method of claim 5, further comprising:

selecting a value of t according to how rapidly a medium characterization factor is expected to change over a course of data collection.

8. The method of claim 1, wherein characterizing the scattering medium is accomplished by moving a platform carrying a laser imaging detection and ranging (LIDAR) system only once over an object to be detected.

9. The method of claim 1, wherein characterizing the scattering medium is accomplished by moving a platform carrying a laser imaging detection and ranging (LIDAR) system a plurality of times over an object to be detected.

10. A method comprising:

effecting optical properties of a medium to be characterized by determining a scattering rate and an attenuation rate of light through a medium, wherein determining the scattering rate and attenuation rate of light through the medium is accomplished by utilizing polarized light transmitted from an optical source;

effecting reflected depolarized light to be received in an optical receiver, subsequent to contact with an object or sea floor, wherein the optical receiver is range gated over two or more time intervals;

effecting a function to be performed based on the characterized optical properties of the medium, wherein the function is image deblurring of the object in the medium, wherein when the function is image deblurring of the object in the medium, deblurring the image is accomplished by effecting a mathematical deblurring function to be executed, wherein the mathematical deblurring function accounts for the total scattering obtained from using polarized light generated from the optical source.

\* \* \* \* \*